United States Patent
Satou et al.

(10) Patent No.: US 7,237,060 B2
(45) Date of Patent: Jun. 26, 2007

(54) CPU-CONTAINING LSI, AND OPTICAL DISK DEVICE AND LSI DEVICE WITH THE SAME

(75) Inventors: Machiko Satou, Nara (JP); Hiroyuki Yabuno, Hirakata (JP)

(73) Assignee: Matsushita Electic Industrial Co., Ltd., Osaka (JP)

( * ) Notice: Subject to any disclaimer, the term of this patent is extended or adjusted under 35 U.S.C. 154(b) by 365 days.

(21) Appl. No.: 10/794,671

(22) Filed: Mar. 4, 2004

(65) Prior Publication Data

US 2004/0189233 A1    Sep. 30, 2004

(30) Foreign Application Priority Data

Mar. 5, 2003    (JP) .............................. 2003-059134

(51) Int. Cl.
*G06F 13/00*    (2006.01)
(52) U.S. Cl. ..................... 711/112; 711/163; 711/168; 711/169; 717/168; 717/169; 717/174
(58) Field of Classification Search ................ 711/112, 711/163, 168, 169; 717/168, 169, 174
See application file for complete search history.

(56) References Cited

U.S. PATENT DOCUMENTS

| | | | |
|---|---|---|---|
| 4,694,391 A * | 9/1987 | Guttag et al. ................ | 712/32 |
| 5,894,588 A * | 4/1999 | Kawashima et al. .......... | 710/68 |
| 6,532,587 B1 | 3/2003 | Sakai et al. ................. | 717/168 |
| 6,588,010 B1 | 7/2003 | Ogata ......................... | 717/169 |
| 6,594,747 B2 | 7/2003 | Takayasu .................... | 711/163 |
| 2003/0154367 A1 | 8/2003 | Kawai | |

FOREIGN PATENT DOCUMENTS

KR    2001-0024348    3/2001

OTHER PUBLICATIONS

User's Guide, Texas Instruments, SPRU031D, 1994.

* cited by examiner

*Primary Examiner*—Reba I. Elmore
(74) *Attorney, Agent, or Firm*—Hamre, Schumann, Mueller & Larson, P.C.

(57) ABSTRACT

The present invention provides a central processing unit-containing large-scale integration (hereinafter, referred to as a "CPU-containing LSI") in which software stored in an external memory is incorporated partially into a random access memory (hereinafter, referred to as "RAM") and thereby the capacity of the RAM to be used can be held down, and an optical disk device including the same. In the CPU-containing LSI, the RAM includes a software storage region where software read in from the external memory on a module-by-module basis is stored, and an entry table in which entries are stored, with the entries each containing at least information as to a location and a size of a module stored in the software storage region. The CPU refers to the entry table to decide the location where a module to be read in from the external memory to the software storage region is to be stored, according to an incorporation-location search program.

9 Claims, 30 Drawing Sheets

FIG.5A

| Registration No. | Module Name | Initial Address | Size |
|---|---|---|---|
| 1 | 201 | 0 | 100 |
| 2 | 202 | 100 | 200 |
| 3 | 203 | 300 | 400 |
| 4 | 204 | 700 | 500 |

FIG.5B

| Registration No. | Module Name | Initial Address | Size |
|---|---|---|---|
| 1 | 201 | 0 | 100 |
| 2 | 202 | 100 | 200 |
| 3 | 203 | 300 | 400 |
| 4 | 204 | 700 | 500 |
| 5 | 205 | 700 | 300 |

FIG.5C

| Registration No. | Module Name | Initial Address | Size |
|---|---|---|---|
| 1 | 201 | 0 | 100 |
| 2 | 202 | 100 | 200 |
| 3 | 203 | 300 | 400 |
| 4 | 204 | 700 | 500 |
| 5 | 205 | 100 | 300 |

FIG.5D

| Registration No. | Module Name | Initial Address | Size |
|---|---|---|---|
| 1 | 201 | 0 | 100 |
| 2 | 202 | 100 | 200 |
| 3 | 203 | 300 | 400 |
| 4 | 204 | 700 | 500 |
| 5 | 205 | 1200 | 300 |

FIG.10A

| Registration No. | Module Name | Initial Address | Size |
|---|---|---|---|
| 1 | 601 | 0 | 100 |
| 2 | 602 | 100 | 200 |
| 3 | 603 | 300 | 400 |
| 4 | 604 | 700 | 500 |

FIG.10B

| Registration No. | Module Name | Initial Address | Size |
|---|---|---|---|
| 1 | 601 | 0 | 100 |

FIG.10C

| Registration No. | Module Name | Initial Address | Size |
|---|---|---|---|
| 1 | 601 | 0 | 100 |
| 2 | 605 | 100 | 300 |

FIG.10D

| Registration No. | Module Name | Initial Address | Size |
|---|---|---|---|
| 1 | 601 | 0 | 100 |
| 2 | 605 | 100 | 300 |
| 3 | 603 | 400 | 400 |

FIG.10E

| Registration No. | Module Name | Initial Address | Size |
|---|---|---|---|
| 1 | 601 | 0 | 100 |
| 2 | 602 | 100 | 200 |
| 3 | 603 | 300 | 400 |
| 4 | 604 | 700 | 500 |
| 5 | 605 | 1200 | 300 |

<Execution-Module Entry Table>

FIG.15A

| Registration No. | Module Name | Initial Address | Size |
|---|---|---|---|
| 1 | 1001 | 0 | 100 |
| 2 | 1002 | 100 | 200 |
| 3 | 1003 | 300 | 400 |
| 4 | 1004 | 700 | 500 |

FIG.15B

| Registration No. | Module Name | Initial Address | Size |
|---|---|---|---|
| 1 | 1002 | 100 | 200 |
| 2 | 1003 | 300 | 400 |
| 3 | 1004 | 700 | 500 |

FIG.15C

| Registration No. | Module Name | Initial Address | Size |
|---|---|---|---|
| 1 | 1003 | 300 | 400 |
| 2 | 1004 | 700 | 500 |

FIG.15D

| Registration No. | Module Name | Initial Address | Size |
|---|---|---|---|
| 1 | 1004 | 700 | 500 |

| Registration No. | Module Name | Initial Address | Size |
|---|---|---|---|
| 1 | 1005 | 0 | 300 |

<Compressed-Module Entry Table>

| Registration No. | Module Name | Initial Address | Size |
|---|---|---|---|
| 1 | 1001 | 2000 | 100 |

FIG.15I

| Registration No. | Module Name | Initial Address | Size |
|---|---|---|---|
| 1 | 1001 | 2000 | 10 |
| 2 | 1003 | 2010 | 40 |

FIG.29A

| Registration No. | Module Name | Initial Address | Size |
|---|---|---|---|
| 1 | 601 | 0 | 100 |
| 2 | 602 | 100 | 200 |
| 3 | 603 | 300 | 400 |
| 4 | 604 | 700 | 500 |

FIG.29B

| Registration No. | Module Name | Initial Address | Size |
|---|---|---|---|
| 1 | 601 | 0 | 100 |
| 2 | 603 | 300 | 400 |
| 3 | 604 | 700 | 500 |

FIG.29C

| Registration No. | Module Name | Initial Address | Size |
|---|---|---|---|
| 1 | 601 | 0 | 100 |
| 2 | 603 | 100 | 400 |
| 3 | 604 | 500 | 500 |

CPU-CONTAINING LSI, AND OPTICAL DISK DEVICE AND LSI DEVICE WITH THE SAME

BACKGROUND OF THE INVENTION

1. Field of the Invention

The present invention relates generally to a central processing unit-containing large-scale integration (hereinafter, referred to as a "CPU-containing LSI") that reads in software from an external memory to operate, and an optical disk device with such a CPU-containing LSI.

2. Related Background Art

Conventionally, in a CPU-containing LSI, software is read in from an external memory to a memory such as a RAM contained in the LSI and then is executed in a CPU. FIG. 30 shows the configuration of a conventional optical disk device, which is described below. In FIG. 30, numeral 3000 denotes the conventional optical disk device. Numeral 3001 denotes a conventional LSI. Numeral 3002 denotes a CPU that controls the LSI 3001. Numeral 3003 denotes a random access memory (hereinafter, referred to as "RAM") that stores software and can be accessed from the outside, with the software being composed of an instruction sequence that is independent of CPU. Numeral 3004 denotes a read-only memory (hereinafter, referred to as "ROM") that stores an interpreter execution program (3006) for interpreting the software to execute it. Numeral 3010 denotes a communications unit that is used for communications between the LSI 3001 and external units. Numeral 3005 denotes a system control microcomputer for controlling the whole optical disk device 3000. Numeral 3007 denotes an external memory in which software to be stored in the RAM 3003, a program to be executed by the system control microcomputer 3005, etc. have been stored. Numeral 3014 denotes an optical disk.

Furthermore, numeral 3011 indicates an optical disk control unit that is controlled by commands from the LSI 3001 and decides, for instance, the laser power at which recording and reproduction is to be carried out with respect to the optical disk 3014, the rotational speed of the optical disk 3014, and the position of the head. Numeral 3012 denotes a recording/reproducing head that is controlled by the optical disk control unit 3011 and reads signals reproduced from the optical disk 3014 and the laser output. Numeral 3013 denotes a motor that is used for rotating the optical disk 3014 and is controlled by the optical disk control unit 3011. Furthermore, numeral 3006 denotes an interpreter execution program for making the CPU 3002 to execute an interpretation, while numeral 3008 indicates a software storage region.

The CPU 3002 and both the RAM 3003 and the ROM 3004 as well as the external memory 3007 and the system control microcomputer 3005 are connected to each other through a bus, respectively. The system control microcomputer 3005 can access the CPU 3002 and the RAM 3003 through the communications unit 3010. Furthermore, the CPU 3002 also can access the optical disk control unit 3011 through the communications unit 3010.

The operation of the conventional LSI is described below with reference to FIG. 30. First, the system control microcomputer 3005 stores, in the software storage region 3008 of the RAM 3003, software that has been stored in the external memory 3007 and controls the optical disk device. The address from which this storage is started is the initial address of the software storage region 3008. When the system control microcomputer 3005 issues an interpreter execution command to the CPU 3002 through the communications unit 3010, the CPU 3002 executes the interpreter execution program 3006 stored in the ROM 3004. The CPU 3002 interprets the software stored in the software storage region 3008 to execute it. The CPU 3002 controls the optical disk by setting register parameters, issuing commands, and obtaining status with respect to the optical disk control unit 3011 through the communications unit 3010.

The optical disk device described above makes it possible to replace the optical-disk control command with another one or to change parameters of the control command by replacing software stored in the software storage region 3008 with another one. Consequently, the optical disk device described above allows software to be developed on a user-by-user basis without restraint. Furthermore, software for controlling the optical disk device can be developed even after the program stored in the ROM 3004 and the program incorporated into the optical disk control unit 3011 are fixed through prestoring of software in the external memory.

In the conventional optical disk device, however, software stored in the external memory 3007 cannot partially be incorporated into the RAM 3003. Consequently, it is not possible to incorporate software to be executed in the device into the RAM 3003 at the times when the software is required to be executed. Accordingly, all software that has been stored in the external memory 3007 and controls the optical disk has to be incorporated into the RAM 3003. On the other hand, the size of software has increased due to the increase in control items and type of the optical disk to be controlled by the optical disk device. Practically, from the viewpoint of the competition in LSI cost, the capacity of the RAM 3003 is limited. As a result, there were cases where the capacity of software exceeded the software storage capacity of the RAM 3003 and thereby the optical disk device 3000 stopped operating. This resulted in the placement of a limitation that the capacity of software must not exceed the software storage capacity of the RAM 3003 in developing software.

SUMMARY OF THE INVENTION

The present invention solves the aforementioned conventional problem. The present invention provides a CPU-containing LSI with a RAM whose capacity to be used is kept down by incorporating, into the RAM, part of software stored in an external memory. With the use of this, the present invention allows optical disk devices to be developed without being limited by the storage capacity of the RAM.

In order to solve the above-mentioned problem, a first configuration of the CPU-containing LSI according to the present invention includes: a CPU; a RAM; and a read-in control unit for controlling read-in of software from an external memory to the RAM on a module-by-module basis. In the first configuration, the RAM includes a software storage region where the software read in from the external memory on the module-by-module basis is stored and an entry storage region where an entry is stored that includes at least information as to a location and a size of a module stored in the software storage region. The read-in control unit refers to the entry stored in the entry storage region of the RAM to decide a location where a module to be read in from the external memory to the software storage region of the RAM is to be stored.

This configuration allows the software stored in the external memory to be partially incorporated into the RAM. Accordingly, it is possible to provide a CPU-containing LSI with a RAM whose capacity to be used is kept down when compared to the conventional configuration in which the whole software is incorporated into the RAM.

In the CPU-containing LSI of the present invention, it is preferable that the read-in control unit erases, from the entry storage region of the RAM, an entry corresponding to an unnecessary module stored in the software storage region of the RAM. This is preferable because modules that have been executed by the CPU but are no longer necessary can be erased from the RAM and thereby the capacity of the RAM can be used more efficiently.

A second configuration of the CPU-containing LSI according to the present invention includes: a CPU; a RAM; a read-in control unit for controlling read-in of software from an external memory to the RAM; and a compression/expansion control unit for controlling compression and expansion of the software. In the second configuration, the RAM includes an execution-program storage region where the software is stored in a form that permits the CPU to refer thereto and a compressed-program storage region where at least part of the software is stored in a compressed form. When the read-in control unit reads in at least part of the software from the external memory to the RAM, the compression/expansion control unit compresses at least part of the software that has been read into the execution-program storage region and then stores it in the compressed-program storage region. When the software stored in the compressed-program storage region is required to be executed, the compression/expansion control unit expands the software and then stores it in the execution-program storage region.

With this configuration, at least part of the software to be executed successively in the CPU, of software that has been stored in the RAM, can be compressed to be stored in the RAM, and it can be expanded in the RAM as required. Consequently, the capacity of the RAM can be used efficiently.

The CPU-containing LSIs according to the respective configurations described above each can have a configuration further including a ROM that stores at least a read-in control program for controlling read-in of software from the external memory to the RAM, wherein the read-in control unit is implemented through execution of the read-in control program carried out by the CPU. Furthermore, they also can have a configuration in which the CPU and the RAM are contained in one LSI, and the read-in control unit is implemented with another LSI that is located outside the LSI containing the CPU and the RAM and is connected thereto. In the latter, since the process of reading in a software module is carried out with another external LSI, the workload of the CPU contained in the LSI can be reduced.

In order to solve the aforementioned problem, a first configuration of the LSI device according to the present invention includes: a CPU-containing LSI with a CPU and a RAM; and a read-in control LSI that serves as a read-in control unit for controlling read-in of software from an external memory to the RAM on a module-by-module basis, with the external memory being located outside the CPU-containing LSI. In this first configuration, the RAM includes a software storage region where the software read in from the external memory on the module-by-module basis is stored and an entry storage region where an entry is stored, with the entry including at least information as to a location and a size of a module stored in the software storage region. The read-in control unit refers to the entry stored in the entry storage region of the RAM to decide a location where a module to be read in from the external memory to the software storage region of the RAM is to be stored. In this configuration, since the process of reading in a software module is carried out with another external LSI, the workload of the CPU contained in the LSI can be reduced.

Furthermore, in order to solve the above-mentioned problem, a second configuration of the LSI device according to the present invention includes: a CPU-containing LSI with a CPU and a RAM; and a control LSI that serves as a read-in control unit for controlling read-in of software to the RAM from an external memory located outside the CPU-containing LSI and a compression/expansion control unit for controlling compression and expansion of the software. In this second configuration, the RAM includes an execution-program storage region where the software is stored in the form that permits the CPU to refer thereto and a compressed-program storage region where at least part of the software is stored in a compressed form. When the read-in control unit reads in at least part of the software from the external memory to the RAM, the compression/expansion control unit compresses the at least part of the software that has been read in to the execution-program storage region, and then stores it in the compressed program storage region. When the software stored in the compressed program storage region is required to be executed, the compression/expansion control unit expands the software and then stores it in the execution-program storage region. In this configuration, since the process of reading in a software module and the process of compressing and expanding it are executed with another external LSI, the workload of the CPU contained in the LSI can be reduced.

In order to solve the aforementioned problem, a first configuration of the optical disk device according to the present invention includes: a CPU-containing LSI according to any one of the configurations described above; a software storage memory serving as the external memory that stores software composed of a plurality of modules for controlling each of recording and reproducing operations carried out with respect to a plurality of types of optical disks; and a disk discrimination unit for discriminating between the types of optical disks. In this first configuration, the read-in control unit of the CPU-containing LSI controls read-in of a module from the software storage memory to a RAM of the CPU-containing LSI according to a result of discrimination made by the disk discrimination unit.

With this configuration, only the part of modules that is required depending on the type of disk, of the software stored in the software storage memory serving as the external memory, can be incorporated into the RAM. Accordingly, unlike the conventional configuration in which the whole software is incorporated into the RAM, this configuration allows optical disk devices to be developed and provided without being limited by the capacity of the RAM to be used.

In order to solve the problem mentioned above, a second configuration of the optical disk device according to the present invention includes: a CPU-containing LSI according to any one of the configurations described above; a software storage memory serving as the external memory that stores software composed of a plurality of modules for controlling each of a series of processes of recording and reproducing operations carried out with respect to an optical disk; and a processing-status discrimination unit for discriminating progress of each of the processes. In this second configuration, the read-in control unit of the CPU-containing LSI controls read-in of a module from the software storage memory to the RAM of the CPU-containing LSI according to a result of discrimination made by the processing-status discrimination unit.

With this configuration, only the module required for each process, of the software stored in the software storage memory serving as the external memory, can be incorporated into the RAM. Accordingly, unlike the conventional configuration in which the whole software is incorporated into the RAM, this configuration allows optical disk devices to be developed and provided without being limited by the capacity of the RAM to be used.

In order to solve the aforementioned problem, a third configuration of the optical disk device according to the present invention includes: a CPU-containing LSI according to any one of the configurations described above; and a software storage memory serving as the external memory that stores software composed of a plurality of modules for controlling each of recording and reproducing operations carried out with respect to an optical disk at a plurality of operation modes. In this third configuration, the read-in control unit of the CPU-containing LSI controls read-in of a module from the software storage memory to a RAM of the CPU-containing LSI corresponding to a change in the operation modes.

With this configuration, only the module required for each operation mode, of the software stored in the software storage memory serving as the external memory, can be incorporated into the RAM. Accordingly, unlike the conventional configuration in which the whole software is incorporated into the RAM, this configuration allows optical disk devices to be developed and provided without being limited by the capacity of the RAM to be used. Furthermore, particularly in the case where the operation modes include a sleep mode, there is an advantage that the capacity of the memory to be refreshed during the sleep mode can be reduced considerably, which results in low power consumption.

BRIEF DESCRIPTION OF THE DRAWINGS

FIGS. 5A to 5D are tables showing transitions resulting from the incorporation of the software into the memory according to Embodiment 1 of the present invention.

FIGS. 10A to 10E are tables showing transitions resulting from the incorporation of the software into the memory according to Embodiment 2 of the present invention.

FIGS. 15A to 15F and FIGS. 15G to 15I are tables showing transitions resulting from the incorporation of the software into the memory according to Embodiment 3 of the present invention.

FIGS. 29A to 29C are tables showing transitions resulting from the erasure of unnecessary software from the memory in Embodiment 8 of the present invention.

DETAILED DESCRIPTION OF THE INVENTION

Embodiment 1

Figure 1:
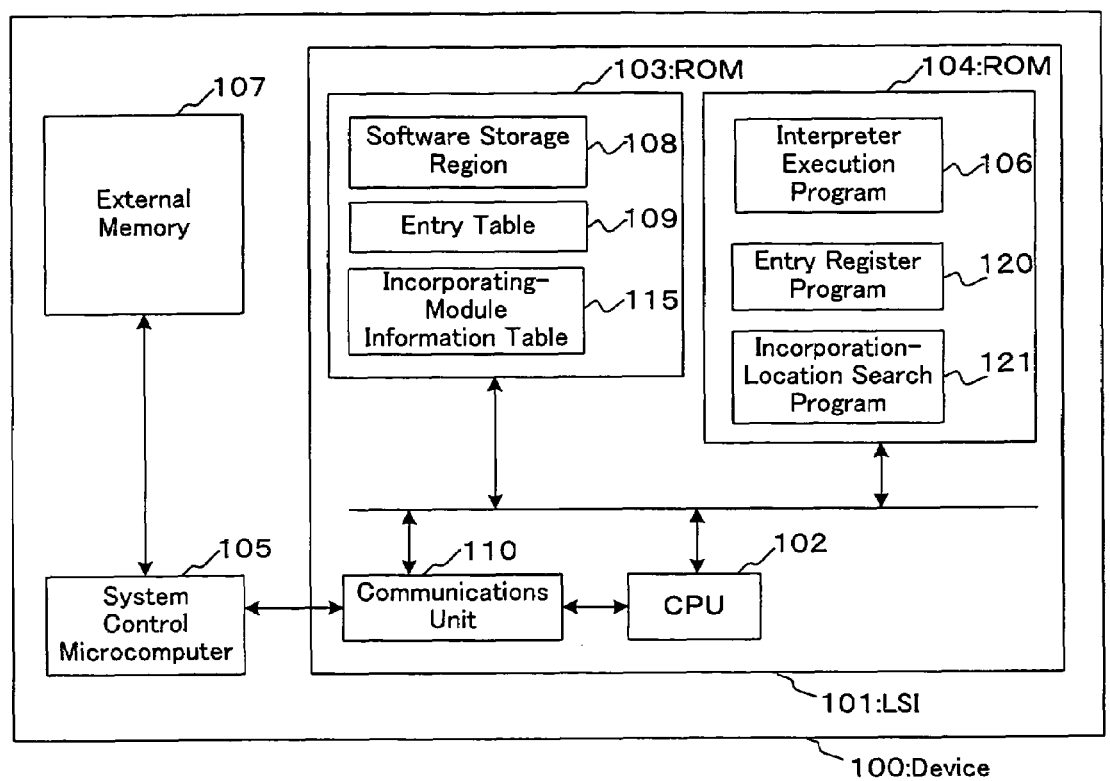
FIG. 1 is a conceptual diagram showing the configuration of a device according to Embodiment 1 of the present invention.

Embodiment 1 of the present invention is described below with reference to the drawings. FIG. 1 shows the configuration of a device according to the present embodiment, which is described below. Numeral 100 indicates a device according to the present embodiment. Numeral 101 denotes an LSI according to the present embodiment. Numeral 102 denotes a CPU that controls the LSI 101. Numeral 107 denotes an external memory in which software to be stored in a RAM 103, a program to be executed by a system control microcomputer 105, etc. are stored.

The RAM 103 can be accessed from the outside and includes at least the following three: 1) a software storage region, which is indicated with numeral 108, where software is to be stored, with the software being composed of an instruction sequence that is independent of the CPU and including a plurality of modules; 2) a table including entries (hereinafter, referred to as an "entry table"), which is indicated with numeral 109, where an entry denotes a set of data including at least a module initial address and module size of the software stored in the software storage region 108 (hereinafter, referred to simply as a "module"); and 3) a table (hereinafter, referred to as an "incorporating-module information table"), which is indicated with numeral 115, in which the name of a module to be newly incorporated into the RAM 103 from the external memory 107 (hereinafter, the module is referred to as an "incorporating module"), the size of the incorporating module, and the name of a module that has been stored in the RAM 103 but is no longer necessary after being executed once (hereinafter, the module is referred to as an "unnecessary module") are stored.

Numeral 104 denotes a ROM that stores the following three programs: 1) an interpreter execution program, which is indicated with numeral 106, that interprets the software stored in the software storage region 108 to execute it; 2) an entry register program, which is indicated with numeral 120, that registers the entry of an incorporating module in the entry table 109; and 3) an incorporation-location search program, which is indicated with numeral 121, that makes a comparison between the size of an entry registered in the entry table 109 and the size of an incorporating module, and judges whether the module registered in the entry table 109 is unnecessary and whether the entry registered in the entry table 109 is the last one registered in the entry table 109 (hereinafter, the last entry registered in the entry table 109 is referred to as a "last entry").

Numeral 110 indicates a communications unit used for communications between the LSI 101 and external units, and numeral 105 a system control microcomputer that controls the device 100 as a whole. The CPU 102 and both the RAM 103 and the ROM 104 as well as the external memory 107 and the system control microcomputer 105 are connected to each other through a bus, respectively. The system control microcomputer 105 can access the CPU 102 and the RAM 103 through the communications unit 110.

Next, the operation of the device 100 according to the present embodiment is described with reference to FIG. 1.

First, the system control microcomputer 105 incorporates, into the RAM 103, modules of software stored in the external memory 107. When the system control microcomputer 105 issues an interpreter execution command to the CPU 102, the CPU 102 executes the interpreter execution program 106 stored in the ROM 104. Thus the CPU 102 interprets the module incorporated into the RAM 103 to execute it.

FIGS. 2A, 2B, 3A, and 3B show the configurations of modules of software stored in the external memory 107 and the module storage status of the RAM 103. Numerals 201 to 206 indicate modules. The descriptions of parts indicated in FIGS. 2A, 2B, 3A, and 3B with the same numerals as those used in FIG. 1 are not repeated.

Figure 4:
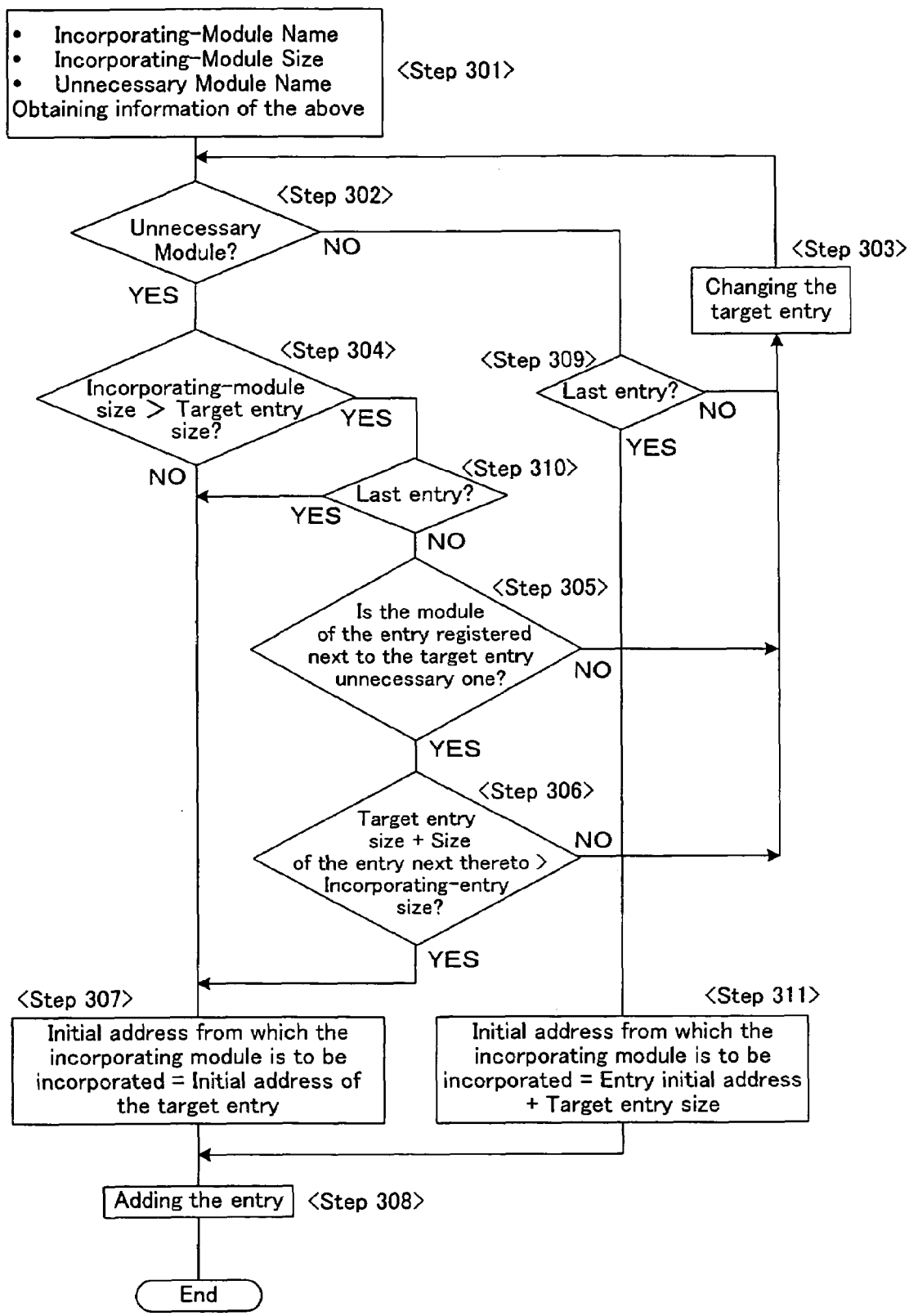
FIG. 4 is a flowchart showing a process of incorporating the software into a memory according to Embodiment 1 of the present invention.

FIG. 4 shows a procedure for incorporating, into the RAM 103, an arbitrary module of the software stored in the external memory 107. FIGS. 5A to 5D show transitions in the entry table 109 that result from the incorporation, into the RAM 103, of the arbitrary one of the modules of the software stored in the external memory 107. As shown in FIGS. 5A to 5D, an entry consists of a registration no., a module name, a module initial address, and a module size. In FIGS. 5A to 5D, all the numerical values are indicated by the decimal numeral, and the unit of the module sizes indicated therein is kilobyte.

In the below, a specific example of the procedure for incorporating, into the RAM 103, an incorporating module 205 of the software stored in the external memory 107 is described with reference to FIGS. 1 to 5D. In this case, suppose the module storage status of the RAM 103 is that shown in FIG. 2A and the entry table 109 is that shown in FIG. 5A. Furthermore, a module 202 and a module 204 are unnecessary modules and the size of the incorporating module 205 is 300 kilobytes.

As shown in FIG. 4, at Step 301, when the system control microcomputer 105 issues an incorporating-module information storage command to the CPU 102, the CPU 102 allows the RAM 103 to store the name of the incorporating module (the module 205), the size of the incorporating module (300 kilobytes), and the names of unnecessary modules (the modules 202 and 204) in the incorporating-module information table 115.

Subsequently, at Step 302, when the system control microcomputer 105 issues a module incorporation-location search command to the CPU 102, the CPU 102 executes the incorporation-location search program 121. With respect to any one of the entries registered in the entry table 109, the CPU 102 judges from the information of the incorporating-module information table 115 whether the module is unnecessary (hereinafter, an entry subjected to the judgement is referred to as a "target entry"). When Step 302 is executed for the first time, the target entry is the entry whose registration no. is 1. In this case, since the module 201 of the target entry is to be executed successively in the device 100 (i.e. is not unnecessary one), the process proceeds to Step 309.

At Step 309, when the system control microcomputer 105 issues a module incorporation-location search command to the CPU 102, the CPU 102 executes the incorporation-location search program 121. The CPU 102 then judges from the entry table 109 whether the target entry is the last entry. In this case, since the target entry No. 1 is not the last entry, the process proceeds to Step 303.

At Step 303, the target entry is changed to another one. The change is made by a method in which the entry registered next to the current target entry in the entry table 109 is taken as a new target entry. That is, when the current target entry is No. 1, the target entry after the change is No. 2. After the change of the target entry, Step 302 is executed again. At Step 302, since the module 202 of the target entry No. 2 is an unnecessary one, the process proceeds to Step 304.

At Step 304, when the system control microcomputer 105 issues a module incorporation-location search command to the CPU 102, the CPU 102 executes the incorporation-location search program 121. The CPU 102 obtains the size of the incorporating module 205 from the information of the incorporating-module information table 115 and the size of the module of the target entry from the entry table 109 and then makes a comparison between the size of the incorporating module 205 and that of the module of the target entry. In this case, the size of the incorporating module 205 is 300 kilobytes, and the size of the module of the target entry is 200 kilobytes, i.e. the size of the module of the target entry is smaller than that of the incorporating module 205. Hence, in order to check whether the incorporating module 205 can be incorporated into the region of the RAM 103 where the module 202 has been stored, the process proceeds to Step 310.

At Step 310, when the system control microcomputer 105 issues a module incorporation-location search command to the CPU 102, the CPU 102 executes the incorporation-location search program 121. The CPU 102 then judges whether the target entry is the last entry. It is judged from the entry table 109 that the target entry No. 2 is not the last entry. Hence, in order to check whether the module of the entry registered next to the current target entry is an unnecessary one, the process proceeds to Step 305.

At Step 305, when the system control microcomputer 105 issues a module incorporation-location search command to the CPU 102, the CPU 102 executes the incorporation-location search program 121. The CPU 102 then judges from the information of the incorporating-module information table 115 whether the module of the entry registered next to the target entry is an unnecessary one. According to the entry table 109, the entry registered next to the target entry No. 2 is the entry No. 3. From the information of the incorporating-module information table 115, it is judged by the CPU 102 that a module 203 that is the module of the entry No. 3 is one to be executed successively in the device 100. Accordingly, the incorporating module 205 cannot be incorporated into the area of the RAM 103 where the module 202 has been stored. Consequently, the process proceeds to Step 303. After the target entry is changed from No. 2 to No.3, the process proceeds to Step 302 again. At Step 302, it is judged that the module 203 of the target entry No. 3 is one to be executed successively in the device 100. Accordingly, the process proceeds to Step 309.

At Step 309, since the target entry No. 3 is not the last entry, the target entry is changed from No. 3 to No. 4 at Step 303 and then the process proceeds to Step 302 once again. At Step 302, it is judged that the module 204 of the target entry No. 4 is an unnecessary one. Accordingly, the process proceeds to Step 304. Since the size of the module 204 of the target entry No. 4 is 500 kilobytes and that of the incorporating module 205 is 300 kilobytes, it is judged at Step 304 that the size of the module of the target entry is larger than that of the incorporating module 205. Consequently, the process proceeds to Step 307.

At Step 307, the CPU 102 notifies the system control microcomputer 105 about the initial address from which the incorporating module 205 is to be incorporated in the RAM 103, through the communications unit 110. In this case, the initial address from which the incorporating module 205 is to be incorporated in the RAM 103 is the initial address (700) of the module of the target entry. The system control microcomputer 105 incorporates the incorporating module 205 from the external memory 107 into the RAM 103 through the communications unit 110, with the module being incorporated from the initial address (700).

Figure 2A:
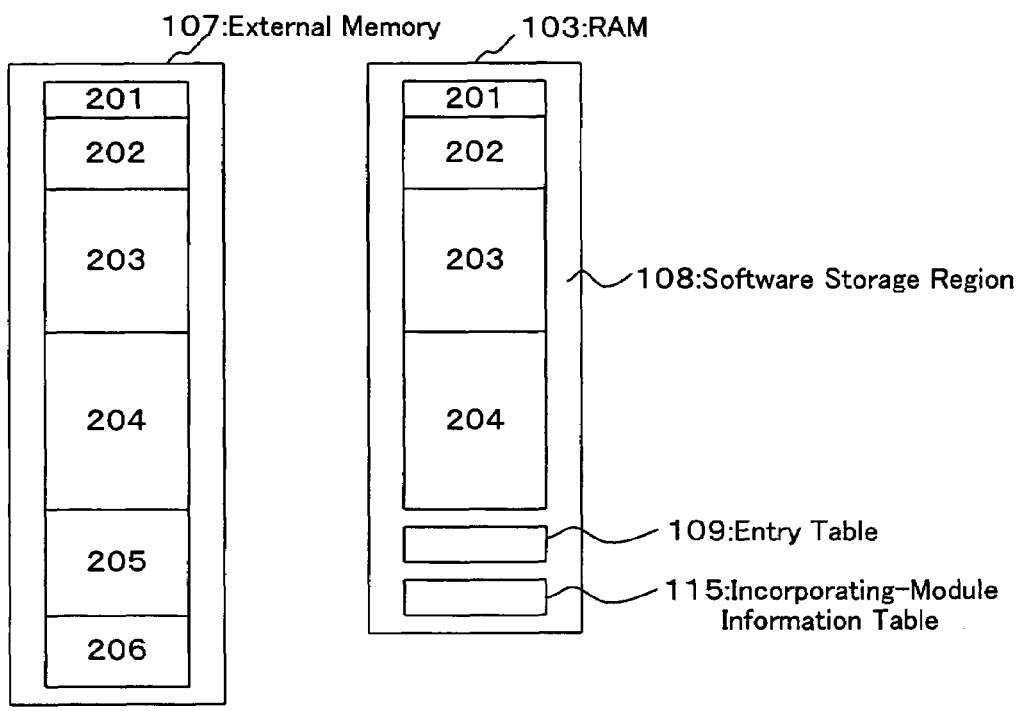
FIGS. 2A and 2B each show a conceptual diagram illustrating the configuration of modules of software according to Embodiment 1 of the present invention.
Figure 2B:
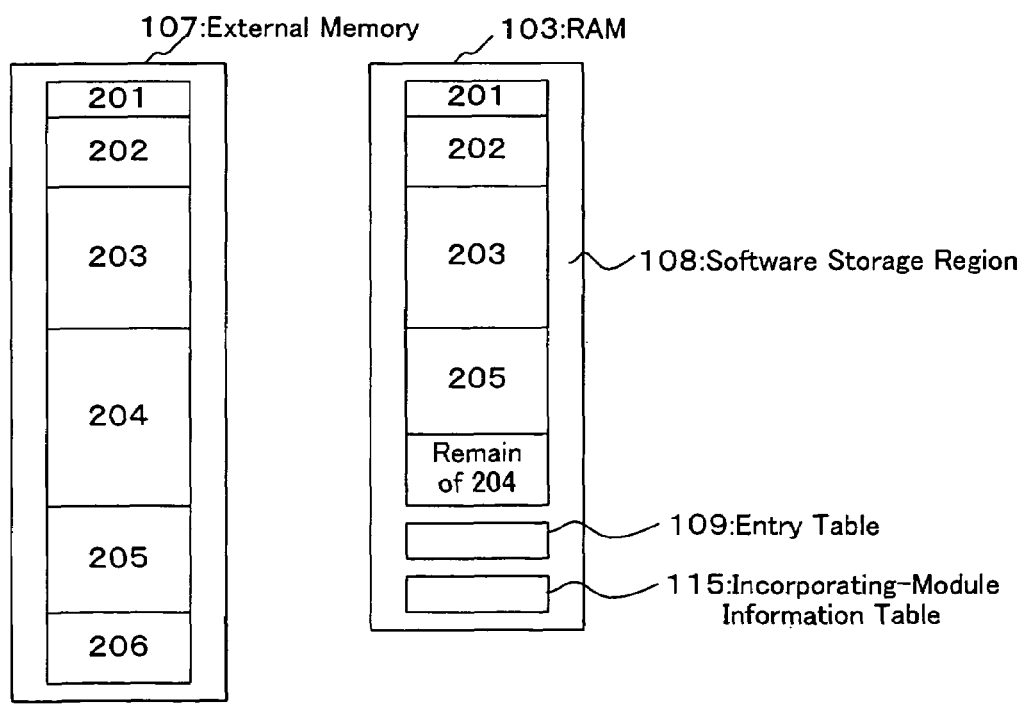
Figure 3A:
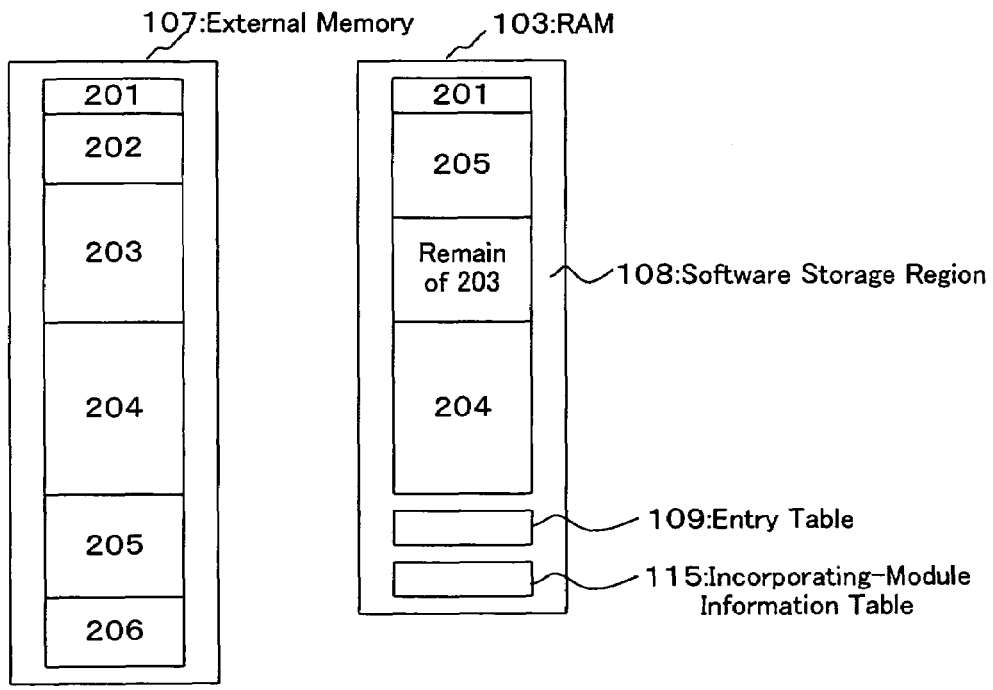
FIGS. 3A and 3B each show a conceptual diagram illustrating the configuration of the modules of the software according to Embodiment 1 of the present invention.
Figure 3B:
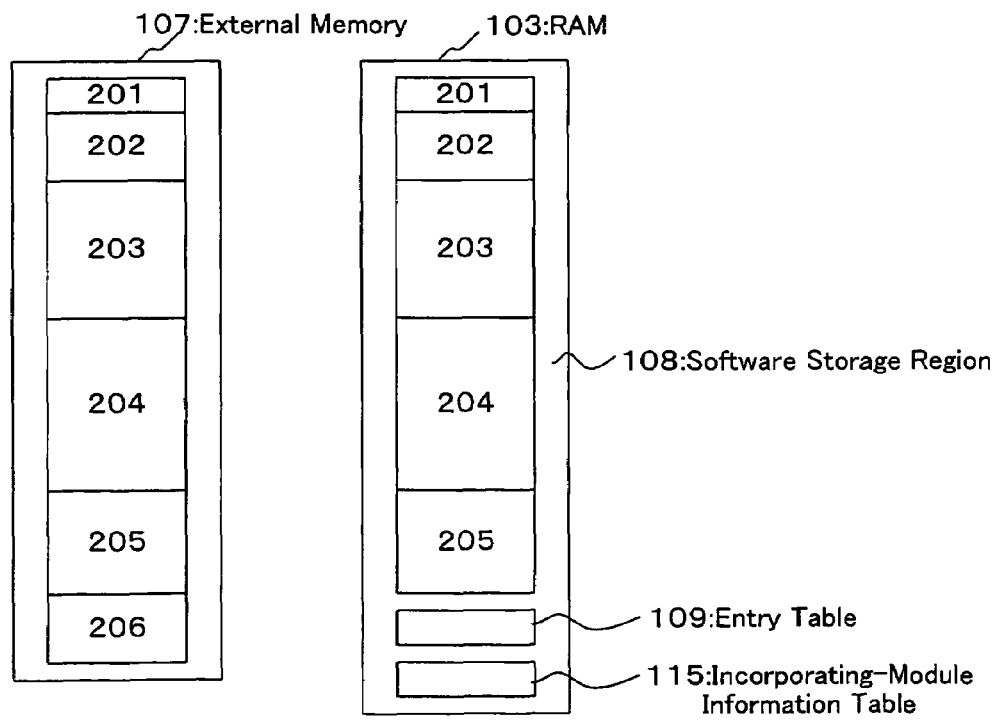

With this incorporation, the module storage status of the RAM 103 changes from that shown in FIG. 2A to that shown in FIG. 2B.

Next, at Step 308, when the system control microcomputer 105 issues an entry register command to the CPU 102, the CPU 102 executes the entry register program 120. The CPU 102 then additionally registers the entry of the incorporating module 205 in the entry table 109. With this register, the status of the entry table 109 changes from that shown in FIG. 5A to that shown in FIG. 5B.

With the procedure described above, the module 205 of the external memory 107 can be incorporated into the RAM 103.

The following description is made with reference to FIGS. 1 to 5D and is directed to another specific example of the procedure for incorporating the incorporating module 205 of the software stored in the external memory 107 into the RAM 103. In this example, suppose the module storage status of the RAM 103 is that shown in FIG. 2A and the entry table 109 is shown in FIG. 5A. In this case, the modules 202 and 203 are unnecessary modules and the size of the incorporating module 205 is 300 kilobytes.

At Step 301, the CPU 102 allows the RAM 103 to store the name of the incorporating module (the module 205), the size of the incorporating module 205 (300 kilobytes), and the names of unnecessary modules (the modules 202 and 203) in the incorporating-module information table 115.

Subsequently, at Step 302, the CPU 102 judges whether the module 201 of the target entry is unnecessary. In this case, since the module 201 of the target entry is to be executed successively in the device 100, the process proceeds to Step 309.

At Step 309, the CPU 102 judges whether the target entry is the last entry. In this case, since the target entry No. 1 is not the last entry, the process proceeds to Step 303.

At Step 303, the target entry is changed to No. 2, and Step 302 then is executed again. At Step 302, the CPU 102 judges that the module 202 of the target entry No. 2 is an unnecessary one, and then the process proceeds to Step 304.

At Step 304, the CPU 102 makes a comparison between the size of the incorporating module and that of the module of the target entry. In this case, the size of the module of the target entry is 200 kilobytes and the size of the incorporating module 205 is 300 kilobytes, i.e. the size of the module of the target entry is smaller than that of the incorporating module 205. Hence, in order to check whether the incorporating module 205 can be incorporated into the area of the RAM 103 where the module 202 has been stored, the process proceeds to Step 310.

At Step 310, the CPU 102 then judges whether the target entry is the last entry. The target entry No. 2 is not the last entry. Hence, in order to check whether the module of the entry registered next to the current target entry is an unnecessary one, the process proceeds to Step 305.

At Step 305, the CPU 102 judges whether the module 203 of the entry registered next to the target entry is an unnecessary one. It is judged from the entry table 109 that the entry registered next to the target entry No. 2 is the entry No. 3. The module 203 that is the module of the entry No. 3 is an unnecessary one. Hence, in order to check whether the incorporating module 205 can be incorporated into the areas of the RAM 103 where the modules 202 and 203 have been stored, the process proceeds to Step 306.

At Step 306, when the system control microcomputer 105 issues a module incorporation-location search command to the CPU 102, the CPU 102 executes the incorporation-location search program 121. The CPU 102 then makes a comparison between the size of the incorporating module 205 and the sum of the sizes of the module of the target entry No. 2 and the module of the entry No. 3 registered next thereto. In this case, according to the entry table 109, the size of the module of the target entry No. 2 is 200 kilobytes and that of the module of the entry No. 3 registered next thereto is 400 kilobytes, i.e. the sum of them is 600 kilobytes. On the other hand, according to the information of the incorporating-module information table 115, the size of the incorporating module 205 is 300 kilobytes. That is, the sum of the sizes of the modules of the target entry and the entry registered next thereto is larger than the size of the incorporating module 205. Accordingly, the incorporating module 205 can be incorporated into the areas of the RAM 103 where the modules 202 and 203 have been stored, and thus the process proceeds to Step 307.

At Step 307, the CPU 102 notifies the system control microcomputer 105 about the initial address from which the incorporating module 205 is to be incorporated in the RAM 103, through the communications unit 110. In this case, the initial address from which the incorporating module 205 is to be incorporated in the RAM 103 is the initial address (100) of the module of the target entry (the module 202). The system control microcomputer 105 incorporates the incorporating module 205 from the external memory 107 into the RAM 103 through the communications unit 110, with the incorporating module 205 being incorporated from the initial address (100). With this incorporation, the module storage status of the RAM 103 changes from that shown in FIG. 2A to that shown in FIG. 3A.

Next, at Step 308, the CPU 102 additionally registers the entry of the incorporating module 205 in the entry table 109. With this registration, the status of the entry table 109 changes from that shown in FIG. 5A to that shown in FIG. 5C.

With the procedure described above, the module 205 of the external memory 107 can be incorporated into the RAM 103.

The following description is made with reference to FIGS. 1 to 5D and is directed to still another specific example of the procedure for incorporating the incorporating module 205 of the software stored in the external memory 107 into the RAM 103. In this example, suppose the module storage status of the RAM 103 is that shown in FIG. 2A and the status of the entry table 109 is that shown in FIG. 5A. In this case, no unnecessary module is present in the RAM 103 and the size of the incorporating module 205 is 300 kilobytes.

At Step 301, the CPU 102 allows the RAM 103 to store the name of the incorporating module (the module 205), the size of the incorporating module (300 kilobytes), and the names of unnecessary modules (none in this case) in the incorporating-module information table 115.

Subsequently, at Step 302, the CPU 102 judges whether the module of the target entry is unnecessary one. In this case, since the module 201 of the target entry is to be executed successively in the device 100, the process proceeds to Step 309.

At Step 309, the CPU 102 judges whether the target entry is the last entry. In this case, since the target entry No. 1 is not the last entry, the process proceeds to Step 303.

At Step 303, the target entry is changed to No. 2, and Step 302 then is executed again. At Step 302, the CPU 102 judges that the module 202 of the target entry is to be executed successively in the device 100. Accordingly, the process proceeds to Step 309. At Step 309, the CPU 102 judges that the target entry is not the last entry. Accordingly, the process proceeds to Step 303. At Step 303, the target entry is changed to No. 3, and Step 302 then is executed once again. At Step 302, the CPU 102 judges that the module 203 of the target entry is to be executed successively in the device 100. Accordingly, the process proceeds to Step 309.

At Step 309, the CPU 102 judges that the target entry is not the last entry. Accordingly, the process proceeds to Step 303. At Step 303, the target entry is changed to No. 4, and Step 302 then is executed once again. At Step 302, the CPU 102 judges that the module 204 of the target entry is to be executed successively in the device 100. Accordingly, the process proceeds to Step 309.

At Step 309, it is judged that the target entry No. 4 is the last entry. Accordingly, the process proceeds to Step 311. The location in the RAM 103 where the incorporating module 205 is to be incorporated is after the module 204 of the last entry (i.e. 1200).

At Step 311, the CPU 102 notifies the system control microcomputer 105 about the initial address from which the incorporating module 205 is to be incorporated in the RAM 103, through the communications unit 110. In this case, the initial address from which the incorporating module 205 is to be incorporated in the RAM 103 is 1200, which indicates the location after the module 204 of the last entry. The system control microcomputer 105 incorporates the incorporating module 205 from the external memory 107 into the RAM 103 through the communications unit 110, with the incorporating module 205 being incorporated from the initial address (1200). With this incorporation, the module storage status of the RAM 103 changes from that shown in FIG. 2A to that shown in FIG. 3B. Subsequently, the process proceeds to Step 308. The CPU 102 then additionally registers the entry of the incorporating module 205 in the entry table 109, and thereby the status of the entry table 109 changes from that shown in FIG. 5A to that shown in FIG. 5D.

With the procedure described above, the module 205 of the external memory 107 can be incorporated into the RAM 103.

Embodiment 2

Figure 6:
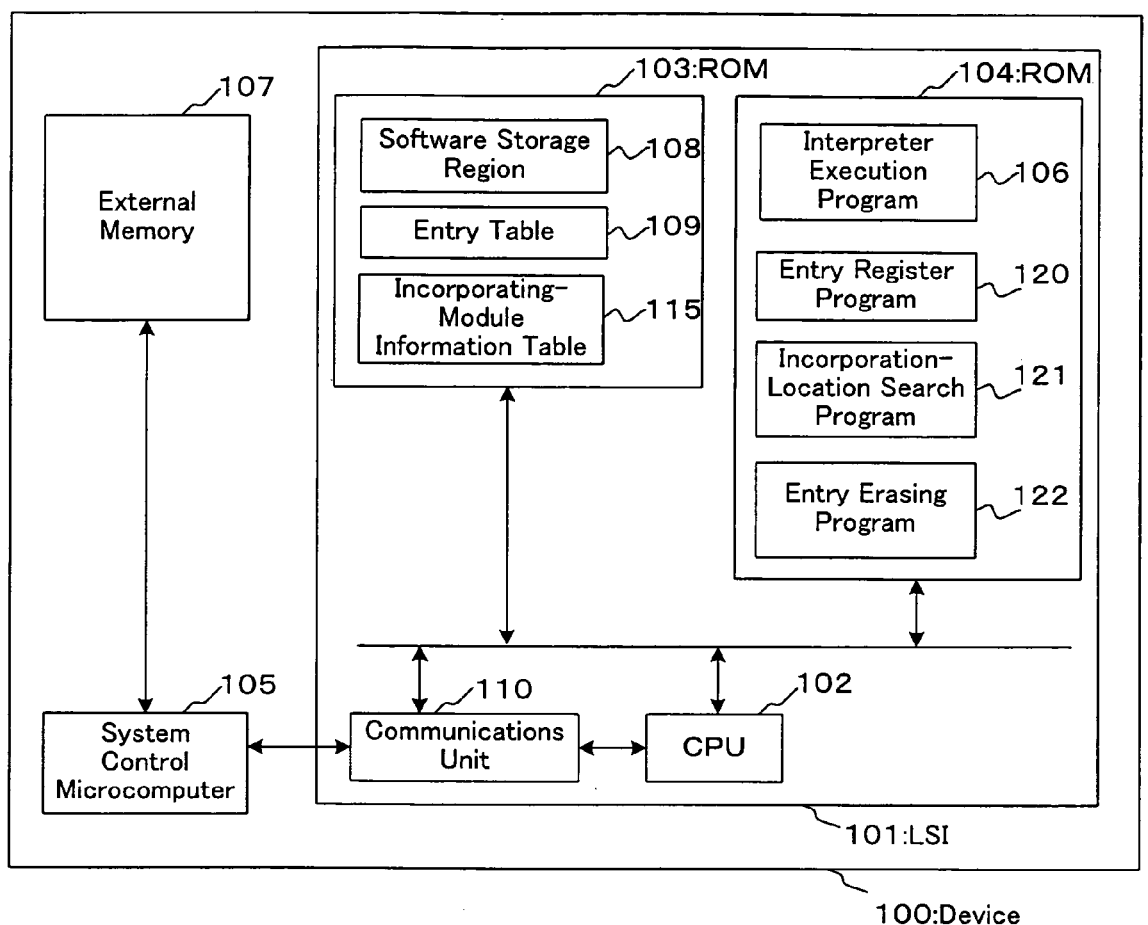
FIG. 6 is a conceptual diagram showing the configuration of a device according to Embodiment 2 of the present invention.
Figure 7A:
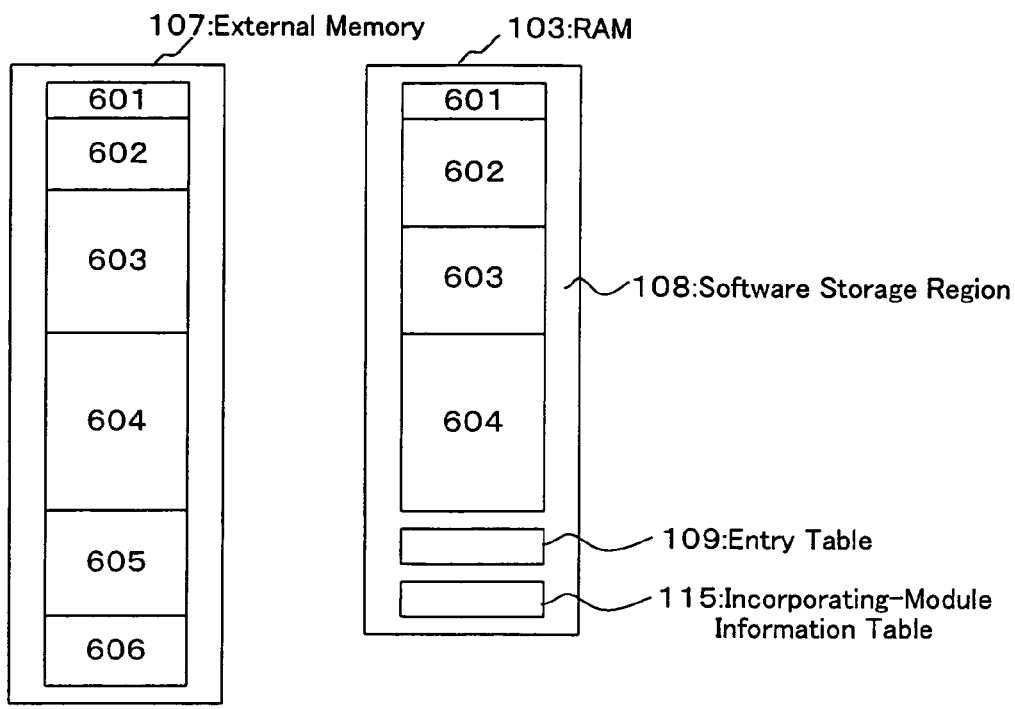
FIGS. 7A and 7B each show a conceptual diagram illustrating the configuration of modules of software according to Embodiment 2 of the present invention.
Figure 7B:
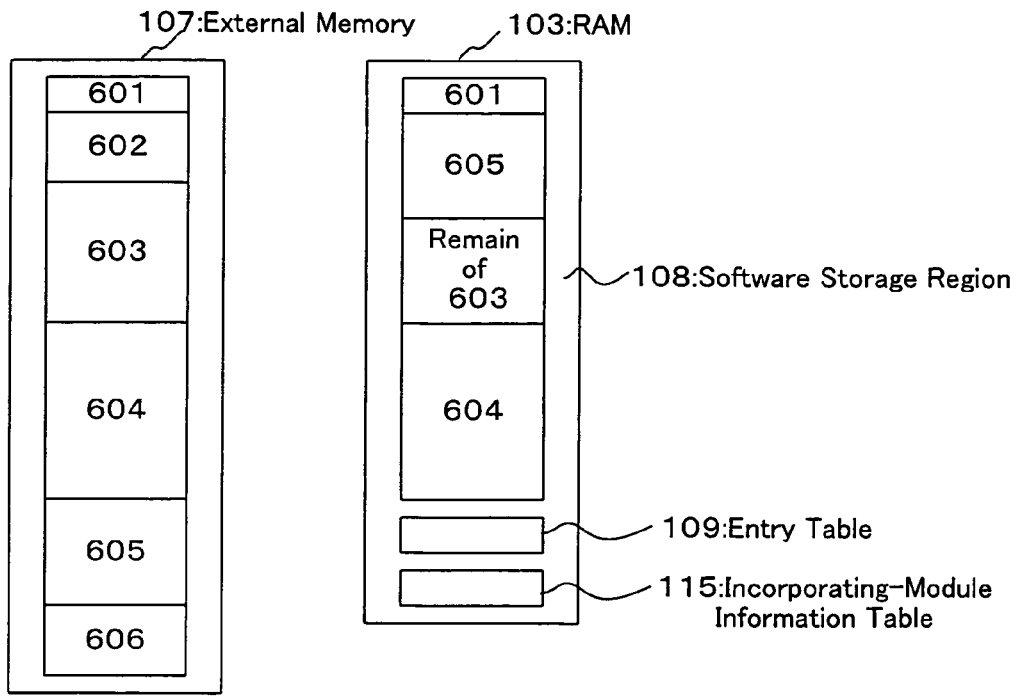
Figure 8A:
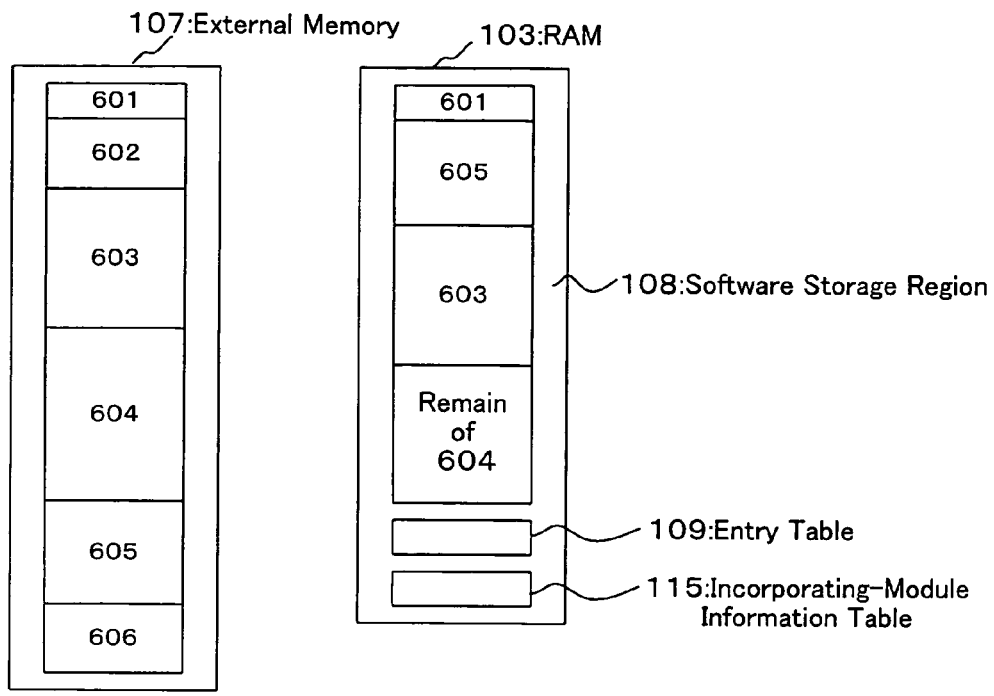
FIGS. 8A and 8B each show a conceptual diagram illustrating the configuration of the modules of the software according to Embodiment 2 of the present invention.
Figure 8B:
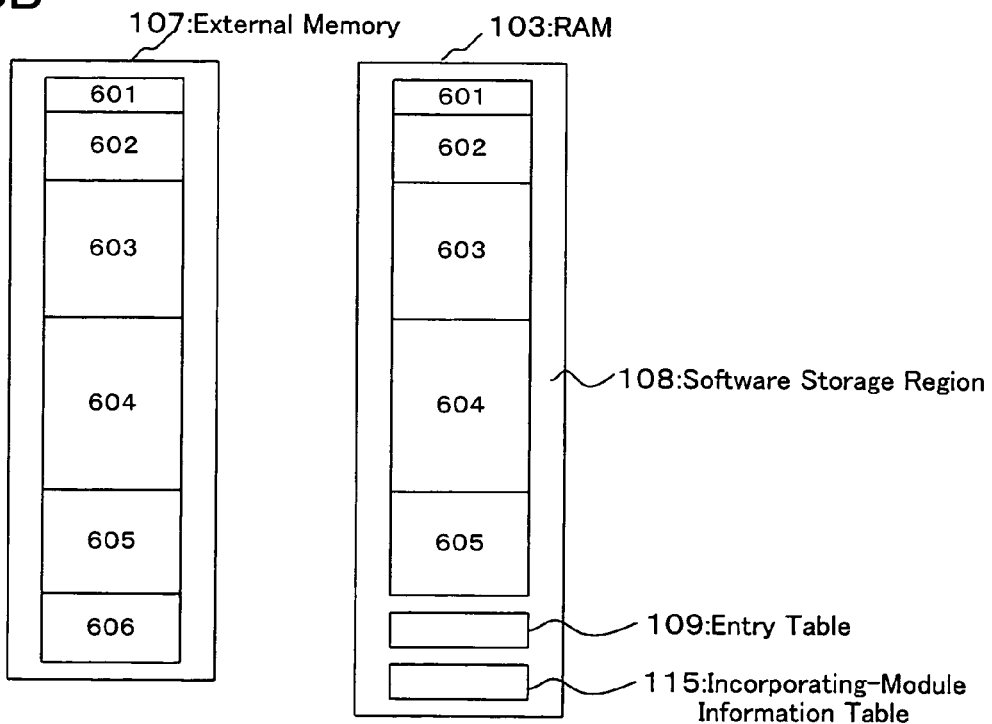

Hereinafter, Embodiment 2 of the present invention is described with reference to the drawings. FIG. 6 shows the configuration of a device according to the present embodiment. As shown in FIG. 6, in the device according to the present embodiment, a program 122 is added to the ROM 104 of the device according to Embodiment 1. The program 122 is a program for erasing, from the entry table 109, an entry of an unnecessary module to be erased from the RAM 103.

Figure 9:
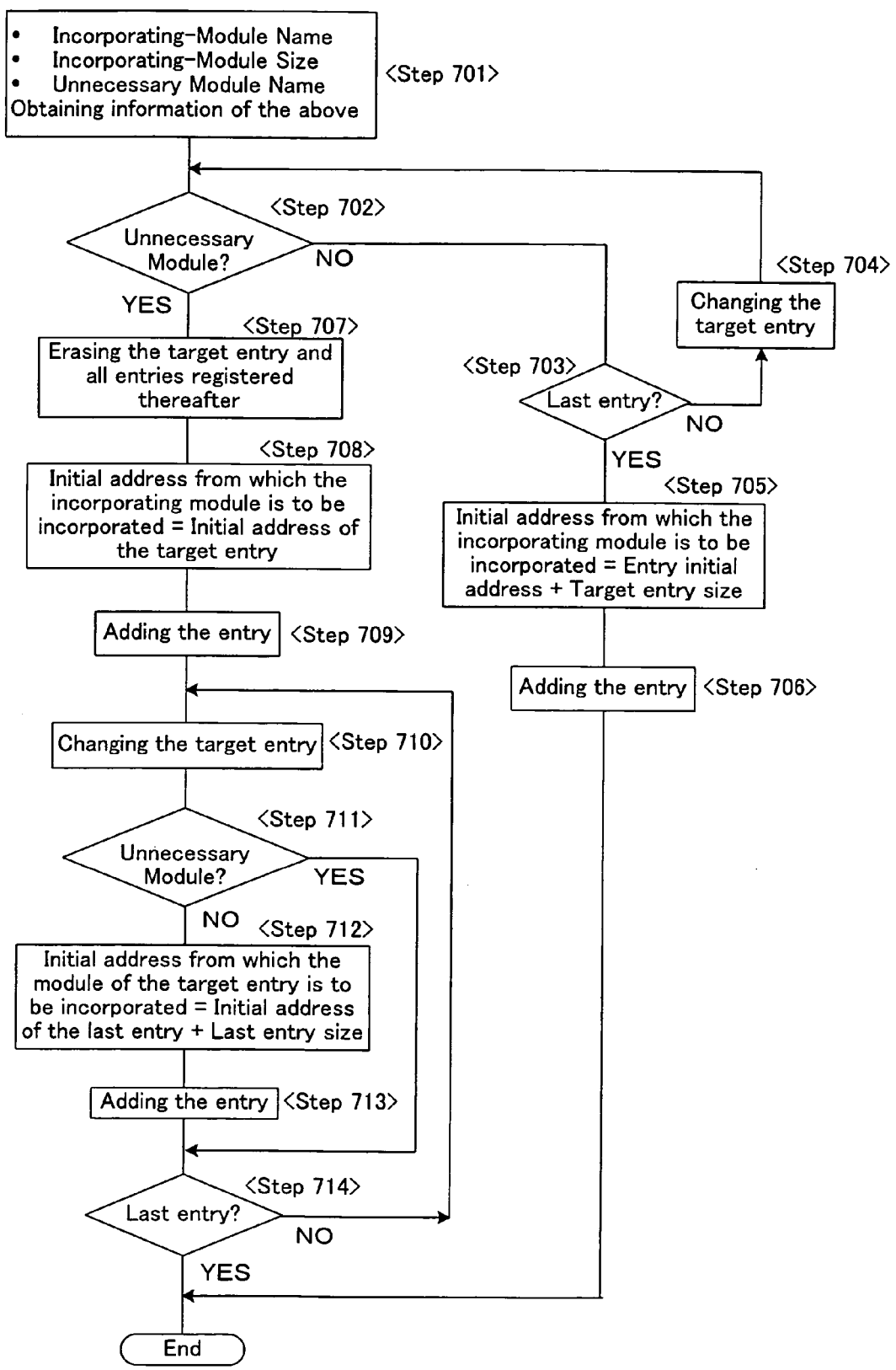
FIG. 9 is a flowchart showing a process of incorporating the software into a memory according to Embodiment 2 of the present invention.

With respect to the operation of the device according to the present embodiment, descriptions of the same parts as those in the device according to Embodiment 1 are not repeated herein. FIGS. 7A, 7B, 8A, and 8B show the configurations of modules of software stored in the external memory 107 and the module storage status of the RAM 103. Numerals 601 to 606 indicate modules. The descriptions of the parts shown in FIGS. 7A, 7B, 8A, and 8B and indicated with the same reference numbers as those used in FIG. 6 are not repeated herein. FIG. 9 shows the procedure for incorporating, into the RAM 103, an arbitrary module of the software stored in the external memory 107. FIGS. 10A to 10E show transitions in the entry table 109 that result from the incorporation, into the RAM 103, of the arbitrary module of the software stored in the external memory 107. The entry includes a registration no., a module name, a module initial address, and a module size. In FIGS. 10A to 10E, all the numerical values are indicated by the decimal numeral, and the unit of the module size is kilobyte.

In the below, a specific example of the procedure for incorporating, into the RAM 103, an incorporating module 605 of the software stored in the external memory 107 is described with reference to FIGS. 6 to 10E. In this case, suppose the module storage status of the RAM 103 is that shown in FIG. 7A and the status of the entry table 109 is that shown in FIG. 10A. Furthermore, modules 602 and 604 are unnecessary modules, and the size of the incorporating module 605 is 300 kilobytes.

At Step 701, when the system control microcomputer 105 issues an incorporating-module information storage command to the CPU 102, the CPU 102 allows the RAM 103 to store the name of the incorporating module (the module 605), the size of the incorporating module (300 kilobytes), and the names of unnecessary modules (the modules 602 and 604) in the incorporating-module information table 115.

Subsequently, at Step 702, when the system control microcomputer 105 issues a module incorporation-location search command to the CPU 102, the CPU 102 executes the incorporation-location search program 121. The CPU 102 judges from the information of the incorporating-module information table 115 whether the module of the target entry is an unnecessary one. When Step 702 is executed for the first time, the target entry is the entry whose registration No. is 1. In this case, since the module 601 of the target entry is to be executed successively in the device 100, the process proceeds to Step 703.

At Step 703, when the system control microcomputer 105 issues a module incorporation-location search command to the CPU 102, the CPU 102 executes the incorporation-location search program 121. The CPU 102 then judges from the entry table 109 whether the target entry is the last entry. In this case, since the target entry No. 1 is not the last entry, the process proceeds to Step 704.

At Step 704, the target entry is changed to another one. The change is made by a method in which the entry registered next to the current target entry in the entry table 109 is taken as a new target entry. That is, when the current target entry is No. 1, the target entry after the change is No. 2. After the change of the target entry, Step 702 is executed again. At Step 702, it is judged that the module 602 of the target entry No. 2 is unnecessary one. Accordingly, the process proceeds to Step 707.

At Step 707, when the system control microcomputer 105 issues an entry erasing command to the CPU 102, the CPU 102 executes the entry erasing program 122. The CPU 102 then erases, from the entry table 109, the target entry No. 2 and those registered after the target entry, i.e. the entries Nos. 2, 3, and 4, of the entries registered in the entry table 109. With this erasure, the status of the entry table 109 changes from that shown in FIG. 10A to that shown in FIG. 10B.

Next, at Step 708, the CPU 102 notifies the system control microcomputer 105 about the initial address from which the incorporating module 605 is to be incorporated in the RAM 103, through the communications unit 110. In this case, since the incorporating module 605 is to be incorporated into the area where the module 602 of the target entry that is an unnecessary one has been stored, the initial address (100) of the target entry is used as the initial address of the incorporating module 605. The system control microcomputer 105 incorporates the incorporating module 605 from the external memory 107 into the RAM 103 through the communications unit 110, with the incorporating module 605 being incorporated from the initial address (100). With this incorporation, the module storage status of the RAM 103 changes from that shown in FIG. 7A to that shown in FIG. 7B.

Next, at Step 709, when the system control microcomputer 105 issues an entry register command to the CPU 102, the CPU 102 executes the entry register program 120. The CPU 102 additionally registers the entry of the incorporating module 605 in the entry table 109. With this register, the status of the entry table 109 changes from that shown in FIG. 10B to that shown in FIG. 10C. The process then proceeds to Step 710 and thereby the target entry is changed to another one. Subsequently, the process proceeds to Step 711. When the current target entry is No. 2, the target entry after the change is the entry No. 3.

At Step 711, when the system control microcomputer 105 issues a module incorporation-location search command to the CPU 102, the CPU 102 executes the incorporation-location search program 121. The CPU 102 then judges from the information of the incorporating-module information table 115 whether the module of the target entry is an unnecessary one. Since the module 603 of the target entry is to be executed successively in the device 100, it is required to be incorporated into the RAM 103 once again. Accordingly, the process proceeds to Step 712.

At Step 712, the CPU 102 notifies the system control microcomputer 105 about the initial address from which the incorporating module 603 is to be incorporated in the RAM 103, through the communications unit 110. In this case, since the module 603 is to be incorporated after the module 605 of the last entry, the initial address from which the module 603 is to be incorporated in the RAM 103 is indicated with the value obtained through an addition of the module size (300 kilobytes) of the last entry to the module initial address (100) of the last entry, i.e. 400. The system control microcomputer 105 incorporates the module 603 from the external memory 107 into the RAM 103 through the communications unit 110, with the module 603 being incorporated from the initial address 1200. With this incorporation, the module storage status of the RAM 103 changes from that shown in FIG. 7B to that shown in FIG. 8A. Subsequently, the process proceeds to Step 713. When the system control microcomputer 105 issues an entry register command to the CPU 102, the CPU 102 executes the entry register program 120. The CPU 102 additionally registers the entry of the module 603 in the entry table 109. With this registration, the status of the entry table 109 changes from that shown in FIG. 10C to that shown in FIG. 10D.

Next, at Step 714, when the system control microcomputer 105 issues a module incorporation-location search command to the CPU 102, the CPU 102 executes the incorporation-location search program 121. The CPU 102 then judges from the entry table 109 whether the target entry is the last entry. In this case, since the target entry No. 3 is not the last entry, the process proceeds to Step 710 and the target entry then is changed to another one. Subsequently, the process proceeds to Step 711. When the current target entry is No. 3, the target entry after the change is No. 4.

At Step 711, the CPU 102 judges from the information of the incorporating-module information table 115 whether the module of the target entry is an unnecessary one. Since the module 604 of the target entry is an unnecessary one, it is not required to be incorporated into the RAM 103 once again. Accordingly, the process proceeds to Step 714.

At Step 714, the CPU 102 judges from the entry table 109 whether the target entry is the last entry. In this case, since the target entry No. 4 is the last entry, the incorporation of the incorporating module 605 into the RAM 103 is completed.

With the procedure described above, the module 605 of the external memory 107 can be incorporated into the RAM 103.

The following description is made with reference to FIGS. 6 to 10E and is directed to another specific example of the procedure for incorporating the incorporating module 605 of the software stored in the external memory 107 into the RAM 103. In this example, suppose the module storage status of the RAM 103 is that shown in FIG. 7A and the status of the entry table 109 is that shown in FIG. 10A. In this case, no unnecessary module exists in the RAM 103, and the size of the incorporating module 605 is 300 kilobytes.

At Step 701, the CPU 102 allows the RAM 103 to store the name of the incorporating module (the module 605), the size of the incorporating module (300 kilobytes), and the names of unnecessary modules (none in this case) in the incorporating-module information table 115.

Subsequently, at Step 702, the CPU 102 judges whether the module of the target entry is an unnecessary one. In this case, since the module 601 of the target entry is to be executed successively in the device 100, the process proceeds to Step 703.

At Step 703, the CPU 102 judges whether the target entry is the last entry. In this case, since the target entry No. 1 is not the last entry, the process proceeds to Step 704.

At Step 704, the target entry is changed to No. 2, and Step 702 then is executed again. At Step 702, the CPU 102 judges that the module 602 of the target entry is to be executed successively in the device 100. Accordingly, the process proceeds to Step 703.

At Step 703, the CPU 102 judges that the target entry No. 2 is not the last entry. Accordingly, the process proceeds to Step 704. At Step 704, the target entry is changed to No. 3, and Step 702 then is executed once again. At Step 702, the CPU 102 judges that the module 603 of the target entry is to be executed successively in the device 100. Accordingly, the process proceeds to Step 703. At Step 703, the CPU 102 judges that the target entry No. 3 is not the last entry. Accordingly, the process proceeds to Step 704. At Step 704, the target entry is changed to No. 4, and Step 702 then is executed once again. At Step 702, the CPU 102 judges that the module 604 of the target entry is to be executed successively in the device 100. Accordingly, the process proceeds to Step 703. At Step 703, it is judged that the target entry No. 4 is the last entry. Accordingly, the process proceeds to Step 705.

At Step 705, the CPU 102 notifies the system control microcomputer 105 about the initial address from which the incorporating module 605 is to be incorporated in the RAM 103, through the communications unit 110. In this case, the initial address from which the incorporating module 605 is to be incorporated in the RAM 103 is 1200, which indicates the location after the module 604 of the last entry. The system control microcomputer 105 incorporates the incorporating module 605 from the external memory 107 into the RAM 103 through the communications unit 110, with the incorporating module 605 being incorporated from the initial address 1200. With this incorporation, the module storage status of the RAM 103 changes from that shown in FIG. 7A to that shown in FIG. 8B. Subsequently, the process proceeds to Step 706. At Step 706, when the system control microcomputer 105 issues an entry register command to the CPU 102, the CPU 102 executes the entry register program 120. The CPU 102 then additionally registers the entry of the incorporating module 605 in the entry table 109, and thereby the status of the entry table 109 changes from that shown in FIG. 10A to that shown in FIG. 10E.

With the procedure described above, the module 605 of the external memory 107 can be incorporated into the RAM 103.

Embodiment 3

Figure 11:
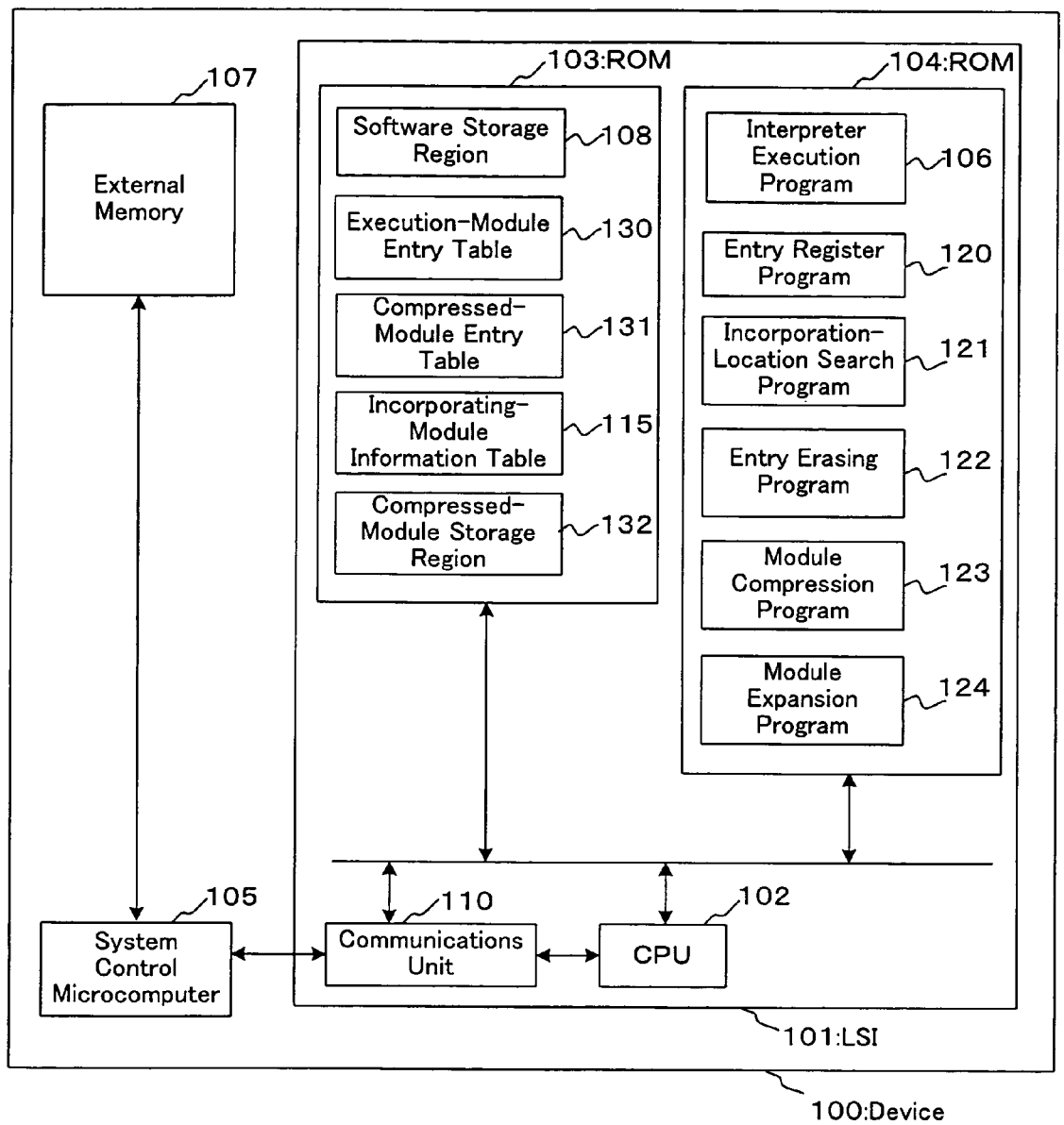
FIG. 11 is a conceptual diagram showing the configuration of a device according to Embodiment 3 of the present invention.

Hereinafter, Embodiment 3 of the present invention is described with reference to the drawings. FIG. 11 shows the configuration of a device according to the present embodiment. As shown in FIG. 11, in the device according to the present embodiment, the entry table 109 is deleted from and two tables and one region are added to the RAM 103 shown in FIG. 6 illustrating the configuration of the device according to Embodiment 2, and two programs are added to the ROM 104 shown in FIG. 6.

One of the tables to be added to the RAM 103 is a compressed-module entry table 131 including entries of modules that have been compressed (hereinafter referred to as "compressed modules"). The other is an execution-module entry table 130 including entries of modules that have been expanded so as to be executed (hereinafter, referred to as "execution modules") after the compressed modules are interpreted with an interpreter execution program. The region added to the RAM 103 is a compressed-module storage region 132 where the compressed modules are stored.

One of the programs additionally included in the ROM 104 is a module compression program 123 for carrying out the process of compressing execution modules and then storing them in the compressed-module storage region. The other is a module expansion program 124 for carrying out the process of expanding the compressed modules included in the RAM 103 and then storing them in the software storage region 108. In this context, examples of general methods of compressing and expanding codes include Lempel-Ziv (LZ) compression and Huffman compression. Any compression-expansion methods can be used for compressing and expanding modules in the present invention.

Figure 12A:
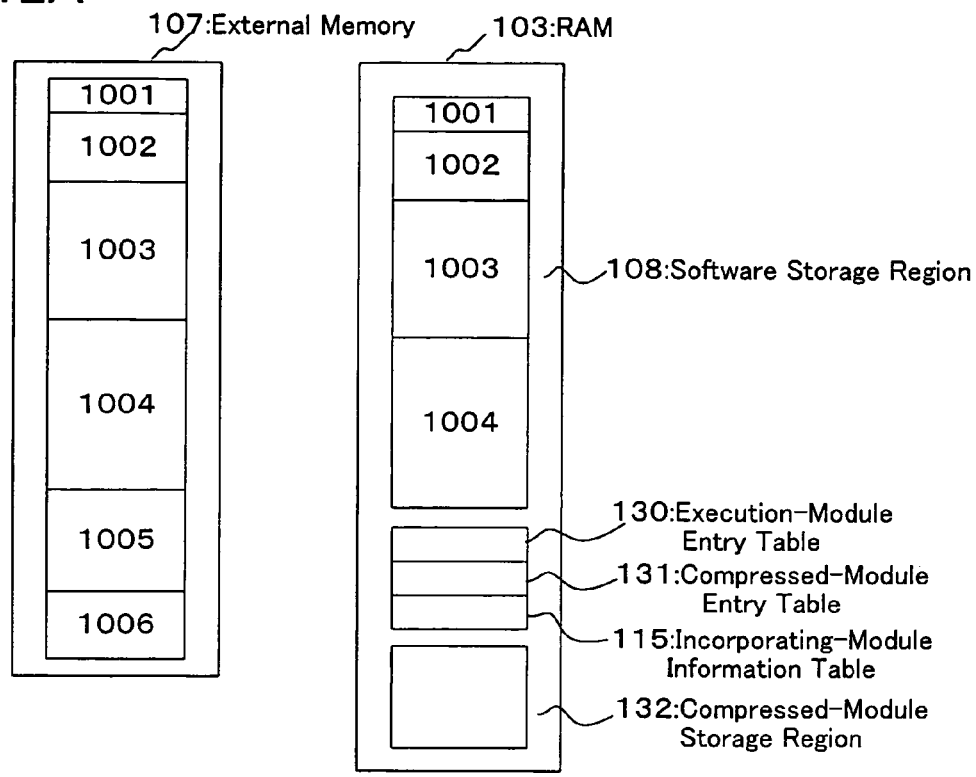
FIGS. 12A and 12B each show a conceptual diagram illustrating the configuration of modules of software according to Embodiment 3 of the present invention.
Figure 12B:
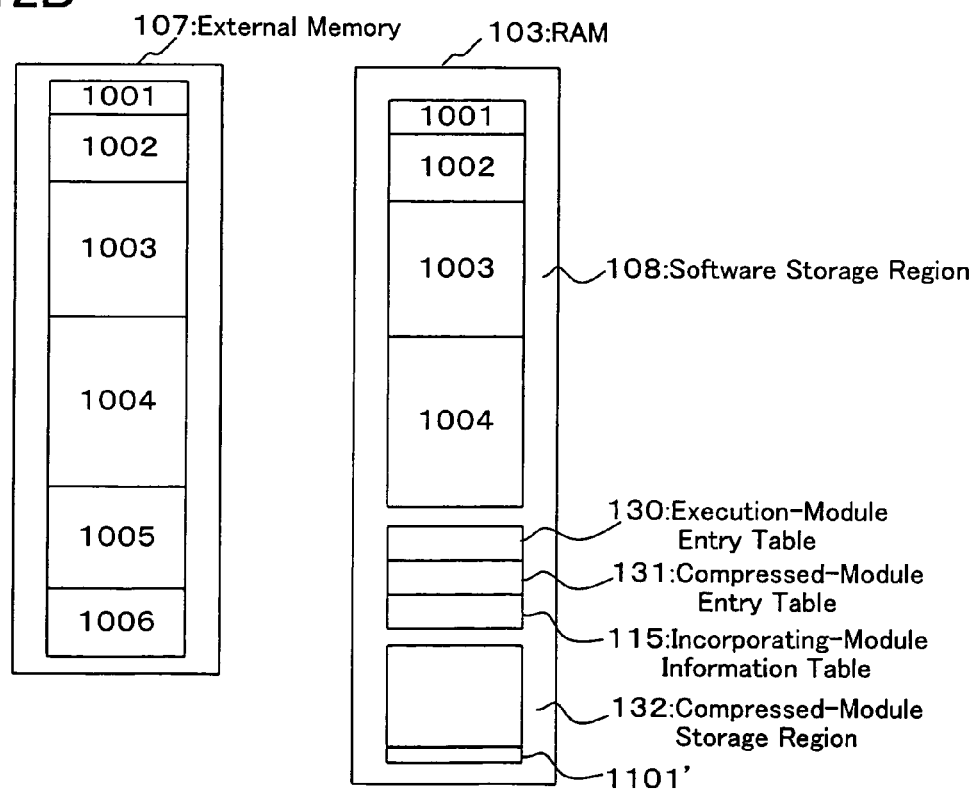
Figure 13A:
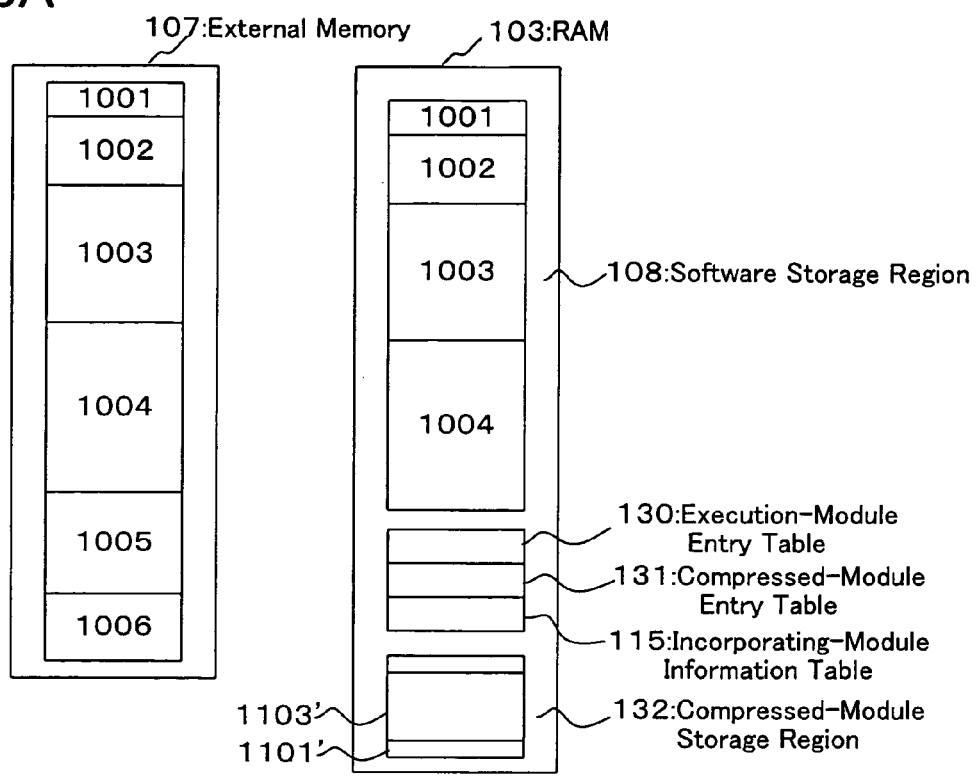
FIGS. 13A and 13B each show a conceptual diagram illustrating the configuration of the modules of the software according to Embodiment 3 of the present invention.
Figure 13B:
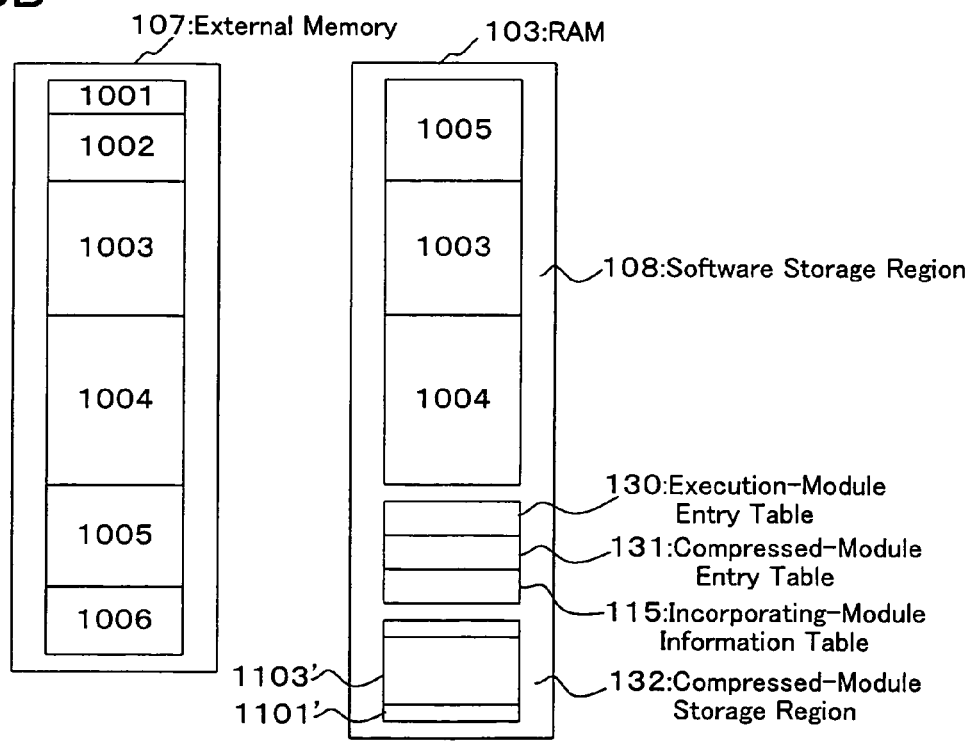
Figure 14:
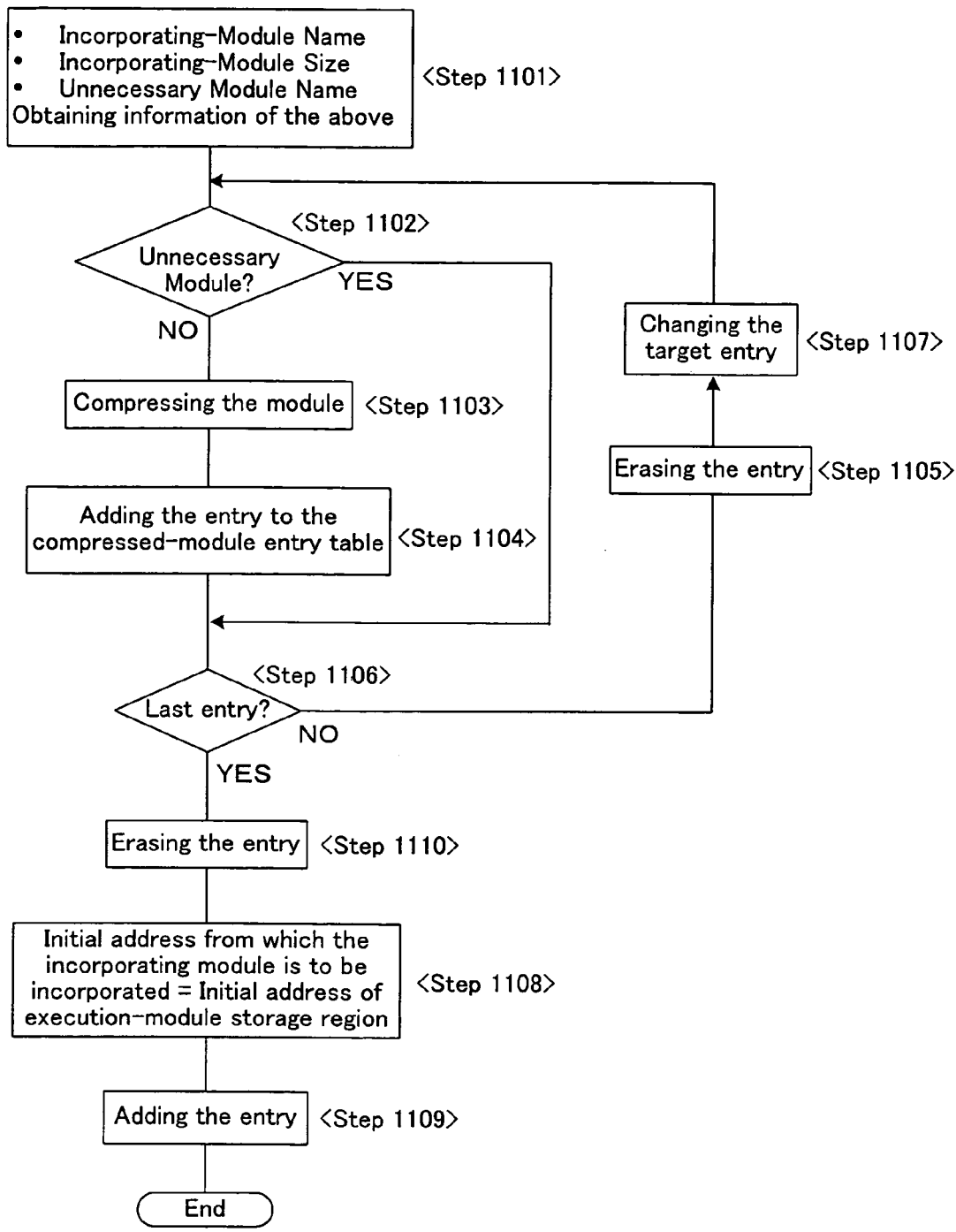
FIG. 14 is a flowchart showing a process of incorporating the software into a memory according to Embodiment 3 of the present invention.

With respect to the operation of the device according to the present embodiment, descriptions of the same parts as those in Embodiment 1 are not repeated herein. FIGS. 12A, 12B, 13A, and 13B show the configurations of modules of software stored in the external memory 107 and the module storage status of the RAM 103. Numerals 1001 to 1006 indicate modules. The descriptions of the parts shown in FIGS. 12A, 12B, 13A, and 13B and indicated with the same reference numbers as those used in FIG. 11 are not repeated herein. FIG. 14 shows the procedure for incorporating, into the RAM 103, an arbitrary module of the software stored in the external memory 107. FIGS. 15A to 15F and FIGS. 15G to 15I show transitions in the execution-module entry table 130 and the compressed-module entry table 131, respectively, which result from the incorporation of the arbitrary module of the software stored in the external memory 107 into the RAM 103. Both in the execution-module entry table 130 and the compressed-module entry table 131, the entry includes a registration no., a module name, a module initial address, and a module size. The sizes of the modules of entries included in the compressed-module entry table 131 are those of the modules that have not been compressed yet.

In FIGS. 15A to 15I, all the numerical values are indicated by the decimal numeral, and the unit of the module size is kilobyte.

In the below, a specific example of the procedure for incorporating, into the RAM 103, an incorporating module 1005 of the software stored in the external memory 107 is described with reference to FIGS. 11 to 15I. In this case, suppose the module storage status of the RAM 103 is that shown in FIG. 12A, the status of the execution-module entry table 130 is that shown in FIG. 15A, and the status of the compressed-module entry table 131 is that shown in FIG. 15G. Furthermore, modules 1002 and 1004 are unnecessary modules, and the size of the incorporating module 1005 is 300 kilobytes.

At Step 1101, when the system control microcomputer 105 issues an incorporating-module information storage command to the CPU 102, the CPU 102 allows the RAM 103 to store the name of the incorporating module (the module 1005), the size of the incorporating module (300 kilobytes), and the names of unnecessary modules (the modules 1002 and 1004) in the incorporating-module information table 115.

Subsequently, at Step 1102, when the system control microcomputer 105 issues a module incorporation-location search command to the CPU 102, the CPU 102 executes the incorporation-location search program 121. The CPU 102 then judges from the information of the incorporating-module information table 115 whether the module of the target entry is an unnecessary one. When Step 1102 is executed for the first time, the target entry is the entry whose registration no. is 1. In this case, since the module 1001 of the target entry is to be executed successively in the device 100, it has to be stored in the compressed-module storage region after being compressed. Accordingly, the process proceeds to Step 1103.

At Step 1103, when the system control microcomputer 105 issues a module compression command to the CPU 102, the CPU 102 executes the module compression program 123. The CPU 102 compresses the module 1001 of the target entry and then stores it in the compressed-module storage region 132. With this storage, the module storage status of the RAM 103 changes from that shown in FIG. 12A to that shown in FIG. 12B. In FIG. 12B, numeral 1001' denotes the compressed module of the module 1001.

Subsequently, at Step 1104, when the system control microcomputer 105 issues a compressed-module entry register command to the CPU 102, the CPU 102 executes the entry register program 120. The CPU 102 then additionally registers the entry of the compressed module 1001' in the compressed-module entry table 131. With this registration, the status of the compressed-module entry table 131 changes from that shown in FIG. 15G to that shown in FIG. 15H.

Next, at Step 1106, when the system control microcomputer 105 issues a module incorporation-location search command to the CPU 102, the CPU 102 executes the incorporation-location search program 121. The CPU 102 then judges from the execution-module entry table 130 whether the target entry is the last entry. Since the entry whose registration no. is 1 is not the last entry, the process proceeds to Step 1105. At Step 1105, when the system control microcomputer 105 issues an entry erasing command to the CPU 102, the CPU 102 executes the entry erasing program 122. The CPU 102 then erases the target entry from the execution-module entry table 130. With this erasure, the status of the execution-module entry table 130 changes from that shown in FIG. 15A to that shown in FIG. 15B.

Subsequently, at Step 1107, the target entry is changed to another one. The change is made by a method in which the entry No. 1 listed in the execution-module entry table 130 is taken as a new target entry. After the change of the target entry, Step 1102 is executed again. At Step 1102, it is judged, from the information of the incorporating-module information table 115, that the module 1002 of the target entry No. 1 is unnecessary one. It therefore is not necessary to compress the module 1002 and then to store it in the compressed-module storage region. Accordingly, the process proceeds to Step 1106.

At Step 1106, the CPU 102 judges from the execution-module entry table 130 whether the target entry is the last entry. In this case, the target entry No. 1 is not the last entry. Accordingly, the process proceeds to Step 1105. At Step 1105, the CPU 102 erases the target entry from the execution-module entry table 130. With this erasure, the status of the execution-module entry table 130 changes from that shown in FIG. 15B to that shown in FIG. 15C.

Subsequently, at Step 1107, the target entry is changed to another one. The entry No. 1 listed in the execution-module entry table 130 is taken as a new target entry. After the change of the target entry, Step 1102 is executed once again. At Step 1102, the CPU 102 judges from the information of the incorporating-module information table 115 whether the module of the target entry is an unnecessary one. In this case, since the module 1003 of the target entry is to be executed successively in the device 100, it is necessary to compress the module 1003 and then to store it in the compressed-module storage region. Accordingly, the process proceeds to Step 1103. At Step 1103, the CPU 102 compresses the module 1003 of the target entry and then stores it in the compressed-module storage region 132. With this storage, the module storage status of the RAM 103 changes from that shown in FIG. 12B to that shown in FIG. 13A. In FIG. 13A, numeral 1003' denotes the compressed module of the module 1003.

Next, at Step 1104, the CPU 102 additionally registers the entry of the compressed module 1003' in the compressed-module entry table 131. With this registration, the status of the compressed-module entry table 131 changes from that shown in FIG. 15H to that shown in FIG. 15I.

Next, at Step 1106, the CPU 102 judges from the execution-module entry table 130 whether the target entry is the last entry. In this case, since the entry No. 1 is not the last entry, the process proceeds to Step 1105. At Step 1105, the CPU 102 erases the target entry from the execution-module entry table 130. With this erasure, the status of the execution-module entry table 130 changes from that shown in FIG. 15C to that shown in FIG. 15D.

Subsequently, at Step 1107, the target entry is changed to another one. The entry No. 1 listed in the execution-module entry table 130 is taken as a new target entry. After the change of the target entry, Step 1102 is executed once again. At Step 1102, it is judged that the module 1004 of the target entry No. 1 is an unnecessary one. Accordingly, the process proceeds to Step 1106.

At Step 1106, the CPU 102 judges from the execution-module entry table 130 whether the target entry is the last entry. In this case, the target entry No. 1 is the last entry. Accordingly, the process proceeds to Step 1110.

At Step 1110, the CPU 102 erases the target entry from the execution-module entry table 130. With this erasure, the status of the execution-module entry table 130 changes from that shown in FIG. 15D to that shown in FIG. 15E.

Next, at Step 1108, the CPU 102 notifies the system control microcomputer 105 about the initial address from which the incorporating module 1005 is to be incorporated in the RAM 103, through the communications unit 110. In this case, the initial address of the incorporating module 1005 is the initial address of the software storage region 108, i.e. 0. The system control microcomputer 105 incorporates the incorporating module 1005 from the external memory 107 into the RAM 103 through the communications unit 110, with the incorporating module 1005 being incorporated from the initial address 0. With this incorporation, the module storage status of the RAM 103 changes from that shown in FIG. 13A to that shown in FIG. 13B.

Subsequently, the process proceeds to Step 1109. At Step 1109, when the system control microcomputer 105 issues an entry register command to the CPU 102, the CPU 102 executes the entry register program 120. The CPU 102 then additionally registers the entry of the incorporating module 1005 in the execution-module entry table 130. With this registration, the status of the execution-module entry table changes from that shown in FIG. 15E to that shown in FIG. 15F.

When the system control microcomputer 105 issues a module expansion command to the CPU 102, the CPU 102 executes the module expansion program 124. The compressed modules 1001' and 1003' that have been compressed and then stored in the compressed-module storage region 132 and are to be executed successively in the device 100 are expanded in the software storage region 108. Like the execution-module entry table 130, the compressed-module entry table 131 is effective in managing the compressed modules.

According to the devices of Embodiments 1 to 3, since software can be stored on a module-by-module basis, modules to be executed in the devices can be stored in the RAM 103 at the times when they are required. Furthermore, the software also can be erased from the RAM 103 on a module-by-module basis. Hence, modules that are no longer necessary after being executed once can be erased from the RAM 103. Accordingly, the capacity of the RAM 103 to be used can be kept down to a minimum. Furthermore, it is not necessary to store, in the RAM 103, all the modules of the software stored in the external memory 107. Consequently, it is possible to develop optical disk devices without placing a limitation that the size of the software must not exceed that of the software region of the RAM 103 provided in the system.

According to the device of Embodiment 3, software is compressed and expanded inside the RAM 103 and thereby the capacity of the RAM 103 to be used can be kept down to a minimum. The specific example of the present embodiment described the configuration of the device in which software is incorporated into the RAM on a module-by-module basis and the compression and expansion also are carried out inside the RAM on a module-by-module basis. However, the unit that is subjected to the processes of incorporation into the RAM as well as compression and expansion inside the RAM is not limited to part of the software (for instance, on a module-by-module basis) but may be the entire software.

Embodiment 4

Figure 16:
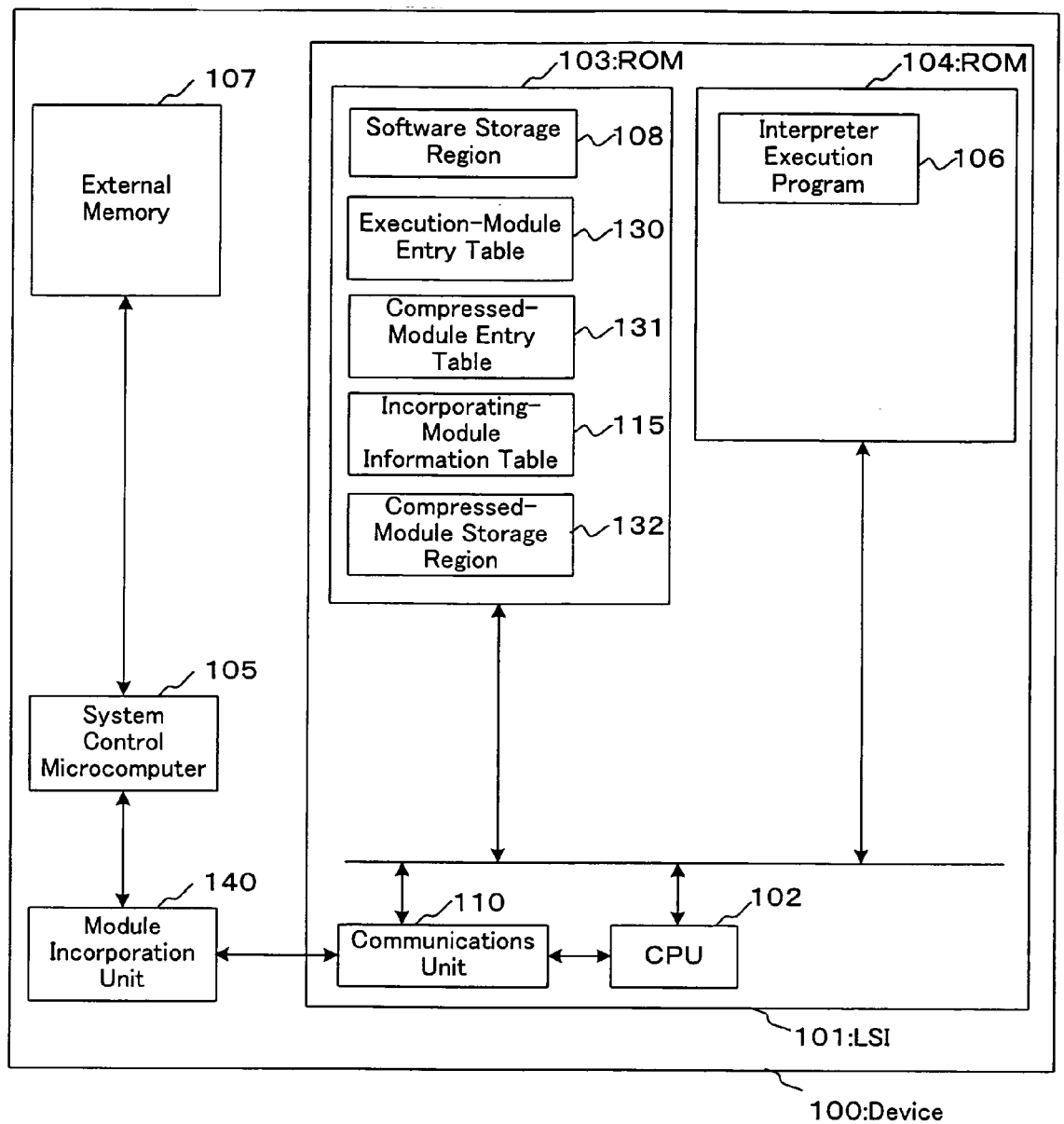
FIG. 16 is a conceptual diagram showing the configuration of a device according to Embodiment 4 of the present invention.

In the below, Embodiment 4 of the present invention is described with reference to the drawings. FIG. 16 shows the configuration of a device according to the present embodiment. As shown in FIG. 16, in the device according to the present embodiment, the entry register program 120, the incorporation-location search program 121, the entry erasing program 122, the module compression program 123, and the module expansion program 124 are deleted from the ROM 104 shown in FIG. 11 illustrating the configuration of the device according to Embodiment 3, and a module incorporation unit 140 is added to the device 100 shown in FIG. 11.

The module incorporation unit 140 can be, for example, another LSI that is not the LSI 101 and has functions for executing the same processes as those executed by the CPU 102 in Embodiment 3 under the control of the entry register program 120, the incorporation-location search program 121, the entry erasing program 122, the module compression program 123, and the module expansion program 124.

That is, a combination of the external LSI serving as the module incorporation unit 140 and the CPU-containing LSI 101 allows the LSI device according to the present invention to be implemented.

The module incorporation unit 140 and the system control microcomputer 105 are connected to each other through a bus. The module incorporation unit 140 can access the RAM 103. With respect to the operation of the device according to the present embodiment, descriptions of the same parts as those in the respective embodiments described above are not repeated herein.

In the below, a specific example of the procedure for incorporating, into the RAM 103, an incorporating module (a module 1005) of software stored in the external memory 107 is described with reference to FIGS. 12A to 16. In this case, suppose the module storage status of the RAM 103 is that shown in FIG. 12A, the status of an execution-module entry table 130 is that shown in FIG. 15A, and the status of a compressed-module entry table 131 is that shown in FIG. 15G. Furthermore, modules 1002 and 1004 are unnecessary modules, and the size of the incorporating module 1005 is 300 kilobytes.

At Step 1101, when the system control microcomputer 105 issues an incorporating-module information storage command to the module incorporation unit 140, the module incorporation unit 140 allows the RAM 103 to store the name of the incorporating module (the module 1005), the size of the incorporating module (300 kilobytes), and the names of unnecessary modules (the modules 1002 and 1004) in the incorporating-module information table 115.

Subsequently, at Step 1102, when the system control microcomputer 105 issues a module incorporation-location search command to the module incorporation unit 140, the module incorporation unit 140 judges from the information of the incorporating-module information table 115 whether the module of the target entry is an unnecessary one. When Step 1102 is executed for the first time, the target entry is the entry whose registration no. is 1. In this case, since the module 1001 of the target entry is to be executed successively in the device 100, it has to be stored in the compressed-module storage region after being compressed. Accordingly, the process proceeds to Step 1103.

At Step 1103, when the system control microcomputer 105 issues a module compression command to the module incorporation unit 140, the module incorporation unit 140 compresses the module 1001 of the target entry and then stores it in the compressed-module storage region 132. With this storage, the module storage status of the RAM 103 changes from that shown in FIG. 12A to that shown in FIG. 12B. In FIG. 12B, numeral 1001' denotes the compressed module of the module 1001.

Subsequently, at Step 1104, when the system control microcomputer 105 issues a compressed-module entry register command to the module incorporation unit 140, the module incorporation unit 140 additionally registers the entry of the compressed module 1001' in the compressed-module entry table 131. With the registration, the status of the compressed-module entry table 131 changes from that shown in FIG. 15G to that shown in FIG. 15H.

Next, at Step 1106, when the system control microcomputer 105 issues a module incorporation-location search command to the module incorporation unit 140, the module incorporation unit 140 judges from the execution-module entry table 130 whether the target entry is the last entry. In this case, since the entry No. 1 is not the last entry, the process proceeds to Step 1105.

At Step 1105, when the system control microcomputer 105 issues an entry erasing command to the module incorporation unit 140, the module incorporation unit 140 erases the target entry from the execution-module entry table 130. With this erasure, the status of the execution-module entry table 130 changes from that shown in FIG. 15A to that shown in FIG. 15B.

Subsequently, at Step 1107, the target entry is changed to another one. The change is made by a method in which the entry No. 1 listed in the execution-module entry table 130 is taken as a new target entry. After the change of the target entry, Step 1102 is executed again. At Step 1102, it is judged, from the information of the incorporating-module information table 115, that the module 1002 of the target entry No. 1 is an unnecessary one. It therefore is not necessary to compress the module 1002 and then to store it in the compressed-module storage region. Accordingly, the process proceeds to Step 1106.

At step 1106, the module incorporation unit 140 judges from the execution-module entry table 130 whether the target entry is the last entry. In this case, the target entry No. 1 is not the last entry. Accordingly, the process proceeds to Step 1105.

At Step 1105, the module incorporation unit 140 erases the target entry from the execution-module entry table 130. With this erasure, the status of the execution-module entry table 130 changes from that shown in FIG. 15B to that shown in FIG. 15C.

Subsequently, at Step 1107, the target entry is changed to another one. The entry No. 1 listed in the execution-module entry table 130 is taken as a new target entry. After the change of the target entry, Step 1102 is executed once again. At Step 1102, the module incorporation unit 140 judges from the information of the incorporating-module information table 115 whether the module of the target entry is an unnecessary one. In this case, since the module 1003 of the target entry is to be executed successively in the device 100, it is necessary to compress the module 1003 and then to store it in the compressed-module storage region. Accordingly, the process proceeds to Step 1103.

At Step 1103, the module incorporation unit 140 compresses the module 1003 of the target entry and then stores it in the compressed-module storage region 132. With this storage, the module storage status of the RAM 103 changes from that shown in FIG. 12B to that shown in FIG. 13A. In FIG. 13A, numeral 1003' denotes the compressed module of the module 1003.

Next, at Step 1104, the module incorporation unit 140 additionally registers the entry of the compressed module 1003' in the compressed-module entry table 131. With this registration, the status of the compressed-module entry table 131 changes from that shown in FIG. 15H to that shown in FIG. 15I.

Next, at Step 1106, the module incorporation unit 140 judges from the execution-module entry table 130 whether the target entry is the last entry. In this case, since the entry No. 1 is not the last entry, the process proceeds to Step 1105.

At Step 1105, the module incorporation unit 140 erases the target entry from the execution-module entry table 130. With this erasure, the status of the execution-module entry table 130 changes from that shown in FIG. 15C to that shown in FIG. 15D.

Subsequently, at Step 1107, the target entry is changed to another one. The entry No. 1 listed in the execution-module entry table 130 is taken as a new target entry. After the change of the target entry, Step 1102 is executed once again. At Step 1102, it is judged that the module 1004 of the target entry No. 1 is an unnecessary one. Accordingly, the process proceeds to Step 1106.

At Step 1106, the module incorporation unit 140 judges from the execution-module entry table 130 whether the target entry is the last entry. In this case, the target entry No. 1 is the last entry. Accordingly, the process proceeds to Step 1110.

At Step 1110, the module incorporation unit 140 erases the target entry from the execution-module entry table 130. With this erasure, the status of the execution-module entry table 130 changes from that shown in FIG. 15D to that shown in FIG. 15E.

Next, at Step 1108, the module incorporation unit 140 notifies the system control microcomputer 105 about the initial address from which the incorporating module 1005 is to be incorporated in the RAM 103. In this case, the initial address of the incorporating module 1005 is the initial address of the software storage region 108, i.e. 0. The system control microcomputer 105 incorporates the incorporating module 1005 from the external memory 107 into the RAM 103 through the communications unit 110, with the incorporating module 1005 being incorporated from the initial address 0. With this incorporation, the module storage status of the RAM 103 changes from that shown in FIG. 13A to that shown in FIG. 13B.

Subsequently, the process proceeds to Step 1109. At Step 1109, when the system control microcomputer 105 issues an entry register command to the module incorporation unit 140, the module incorporation unit 140 additionally registers the entry of the incorporating module 1005 in the execution-module entry table 130. With this registation, the status of the execution-module entry table changes from that shown in FIG. 15E to that shown in FIG. 15F.

When the system control microcomputer 105 issues a module expansion command to the module incorporation unit 140, the module incorporation unit 140 expands the compressed modules 1001' and 1003' that have been compressed and stored in the compressed-module storage region 132 and are to be executed successively in the device 100, in the software storage region 108. Like the execution-module entry table 130, the compressed-module entry table 131 also is effective in managing the compressed modules.

In the specific example described above, the entry register program 120, the incorporation-location search program 121, the entry erasing program 122, the module compression program 123, and the module expansion program 124 are deleted from the ROM 104 of the device according to Embodiment 3 and the functions of these programs are implemented by the external LSI serving as the module incorporation unit 140. However, the device of the present invention is not limited thereto. It is possible to employ a configuration in which the entry register program 120 and the incorporation-location search program 121 are deleted from the ROM 104 of the device according to Embodiment 1 and the functions of these programs are implemented by an external LSI serving as the module incorporation unit 140. Furthermore, it also is possible to employ a configuration in which the entry register program 120, the incorporation-location search program 121, and the entry erasing program 122 are deleted from the ROM 104 of the device according to Embodiment 2 and the functions of these programs are implemented by an external LSI serving as the module incorporation unit 140.

In the device according to Embodiment 4, since software can be stored on a module-by-module basis, modules to be executed in the device can be stored in the RAM 103 at the times when they are required. Furthermore, the software also can be erased from the RAM 103 on a module-by-module basis. Hence, modules that are no longer necessary after being executed once can be erased from the RAM 103. Accordingly, the capacity of the RAM 103 to be used can be kept down to a minimum. Furthermore, since software can be compressed and expanded inside the RAM 103 on a module-by-module basis, the capacity of the RAM 103 to be used can be kept down to a minimum. Moreover, it is not necessary to store, in the RAM 103, all the modules of the software stored in the external memory 107. Consequently, it is possible to develop optical disk devices without placing a limitation that the size of the software must not exceed that of the software region of the RAM 103 provided in the system.

Furthermore, unlike Embodiments 1 to 3, the process of incorporating software from the external memory 107 into the RAM 103, the process of compressing and expanding the software inside the RAM 103, etc are executed with the module incorporation unit 140 included as, for example, an external LSI located outside the LSI 101 and thereby the workload of the CPU 102 can be reduced. Accordingly, it also possible to shorten the time required to incorporate an incorporating module into the RAM 103.

Embodiment 5

Figure 17:
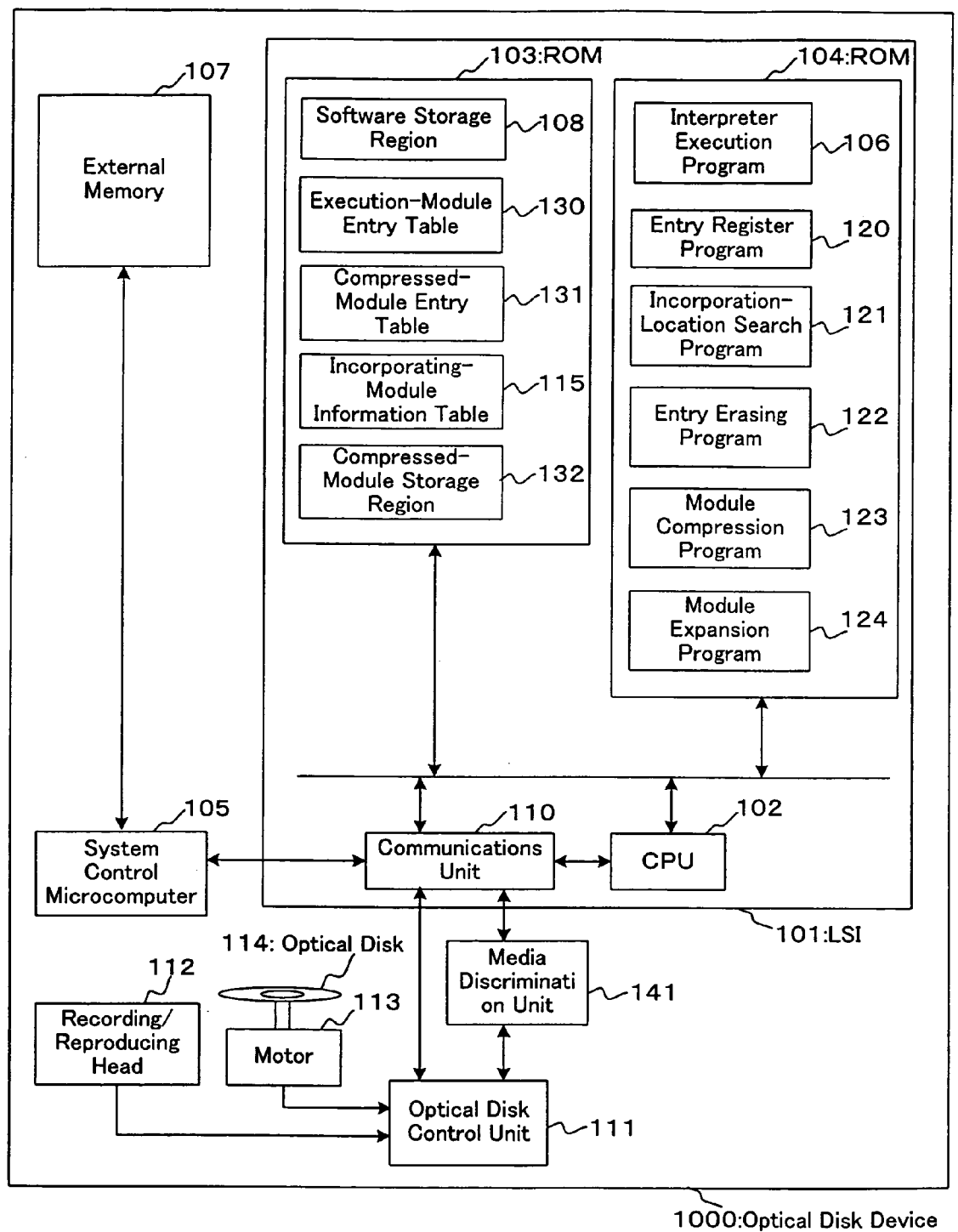
FIG. 17 is a conceptual diagram showing the configuration of a device according to Embodiment 5 of the present invention.

Hereinafter, Embodiment 5 of the present invention is described with reference to the drawings. FIG. 17 shows the configuration of an optical disk device according to the present embodiment. In the optical disk device 1000 shown in FIG. 17, an optical disk control unit 111, a recording/reproducing head 112, a motor 113, and a media discrimination unit 141 are added to the device 100 shown in FIG. 11 illustrating the configuration of the device according to Embodiment 3. The optical disk device 1000 carries out recording and reproduction with respect to an optical disk 114.

The optical disk control unit 111 is controlled by commands from the LSI 101. The optical disk control unit 111 decides the laser power at which recording and reproduction are carried out with respect to the optical disk 114. It also decides the rotational speed of the optical disk 114, the location of the head, etc. The recording/reproducing head 112 is controlled by the optical disk control unit 111 and reads laser outputs and signals reproduced from the optical disk 114. The motor 113 is controlled by the optical disk control unit 111 and rotates the optical disk 114. The media discrimination unit 141 identifies the type of the optical disk 114 (hereinafter referred to as a "medium"). The system control microcomputer 105 and the CPU 102 can access the optical disk control unit 111 and the media discrimination unit 141 through the communications unit 110.

The operation of the optical disk device according to the present embodiment is described with reference to FIG. 17. First, the system control microcomputer 105 stores modules of software that has been stored in the external memory 107 and that controls the optical disk device, in the software storage region 108 of the RAM 103. Subsequently, when the system control microcomputer 105 issues an interpreter execution command to the CPU 102 through the communications unit 110, the CPU 102 executes the interpreter execution program stored in the ROM 104. The CPU 102 then interprets modules stored in the RAM 103 to execute them. The CPU 102 controls recording and reproduction to be carried out with respect to the optical disk by setting register parameters, issuing commands, and obtaining status with respect to the optical disk control unit 111 through the communications unit 110.

The software stored in the external memory 107 includes the following four modules: 1) a module for controlling the optical disk device independent of the medium (hereinafter, referred to as a "common module"); 2) a module for judging whether the substrate thickness of the medium is more than a normal value (hereinafter, the judgement is referred to as "substrate-thickness discrimination" and this module is referred to as a "discrimination module); 3) a module for controlling an optical disk device for media whose substrate thickness is equal to or more than the normal value (hereinafter, referred to as a "compact disk module" or a "CD module"); and 4) a module for controlling an optical disk device for media whose substrate thickness is less than the normal value (hereinafter, referred to as a "digital video disk module" or a "DVD module").

Figure 18:
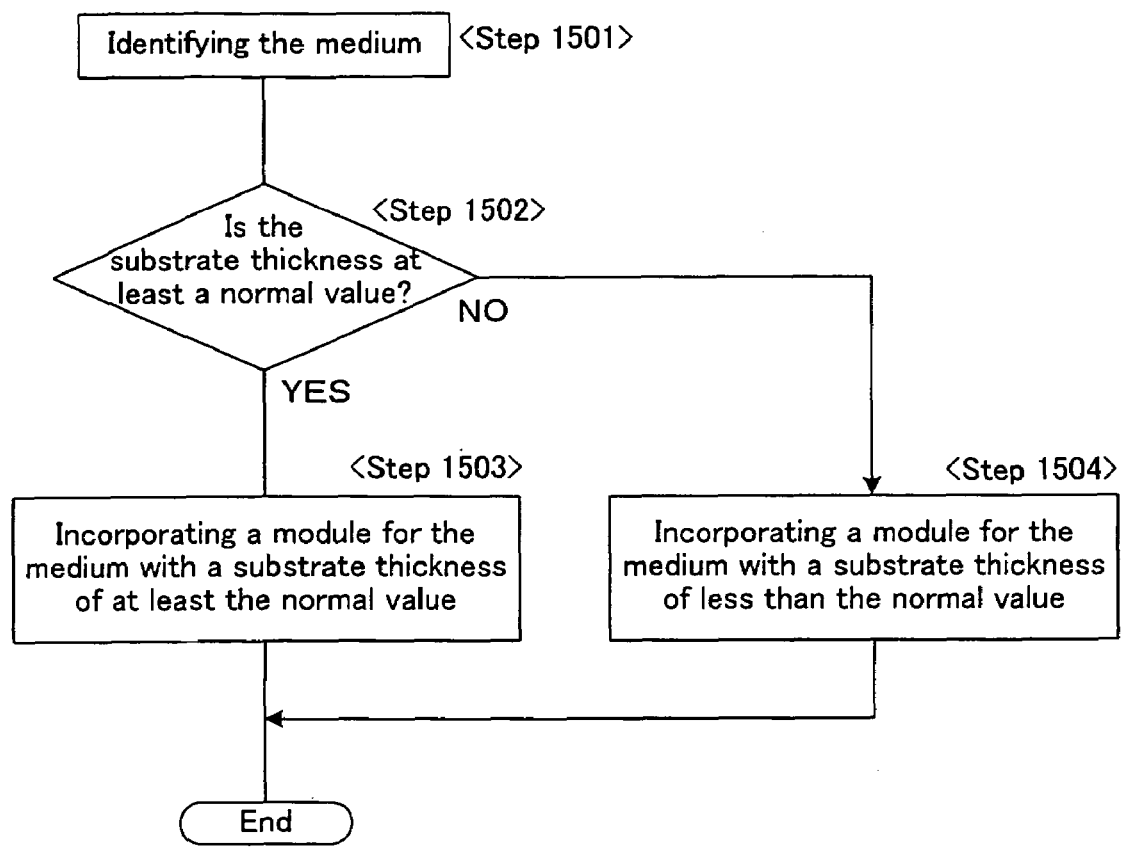
FIG. 18 is a flowchart showing a process of incorporating software into a memory according to Embodiment 5 of the present invention.

FIG. 18 shows the procedure for a process of storing, in the RAM 103, the CD module or DVD module out of the common module, discrimination module, CD module, and DVD module that have been stored in the external memory 107, depending on the result of the substrate-thickness discrimination made in the optical disk device according to the present embodiment. In the below, the procedure for incorporating the modules stored in the external memory 107 into the RAM 103 is described with reference to FIG. 18. In this case, the common module and discrimination module have been stored in the RAM 103.

At Step 1501, when the system control microcomputer 105 issues an interpreter execution command to the CPU 102 through the communications unit 110, the CPU 102 executes the interpreter execution program stored in the ROM 104. The CPU 102 interprets the discrimination module stored in the RAM 103 to execute it. The CPU 102 carries out the media discrimination by operating the media discrimination unit 141 through the communications unit 110. When completing the media discrimination, the media discrimination unit 141 notifies the CPU 102 of the result of the media discrimination through the communications unit 110. The CPU 102 then notifies the system control microcomputer 105 about the result of the media discrimination through the communications unit 110.

Subsequently, at Step 1502, when the result of the media discrimination of which the system control microcomputer 105 has been notified indicates that the substrate thickness of the medium is equal to or more than the normal value, the process proceeds to Step 1503. On the other hand, when the substrate thickness of the medium is less than the normal value, the process proceeds to Step 1504.

At Step 1503, the system control microcomputer 105 incorporates the CD module stored in the external memory 107 into the RAM 103 using the procedure for incorporating modules according to Embodiment 1, 2, or 3.

At Step 1504, the system control microcomputer 105 incorporates the DVD module stored in the external memory 107 into the RAM 103 as in Step 1503.

An optical disk device like the one described above makes it possible to store, in the RAM 103, modules of software corresponding to the medium to be controlled by the device. Accordingly, it allows the capacity of the RAM 103 to be used to be reduced when compared to that in a conventional device that stores, in the RAM, modules of software required to handle all types of media that can be controlled by the optical disk device. Moreover, it is not necessary to store, in the RAM 103, the whole software that has been stored in the external memory 107 and is required to control the optical disk. Accordingly, it is possible to develop optical disk devices without placing a limitation that the size of the software must not exceed that of the software region of the RAM 103 provided in the system.

Furthermore, a similar effect can be obtained even when in the present embodiment, the discrimination module is replaced by a module for discriminating between a medium of a data-recordable type and that of a reproduction-only type, the CD module by a module for controlling an optical disk device for media of a data-recordable type, and the DVD module by a module for controlling an optical disk device for media of a reproduction-only type. Moreover, a similar effect also can be obtained even when the discrimination module is replaced by a module for judging whether a medium is loaded in the device, the CD module by a module for controlling the optical disk device while a medium is loaded in the device, and the DVD module by a module for controlling the optical disk device while no medium is loaded in the device.

In the present embodiment, the optical disk device 1000 is described, as an example, that includes the optical disk control unit 111, the recording/reproducing head 112, the motor 113, and the media discrimination unit 141, which are added to the device 100 shown in FIG. 11 illustrating the configuration of the device according to Embodiment 3, and that carries out recording and reproduction with respect to the optical disk 114. The optical disk device 1000, however, may have a configuration in which any of the devices described in Embodiments 1, 2, and 4 is used instead of the device according to Embodiment 3.

Embodiment 6

Figure 19:
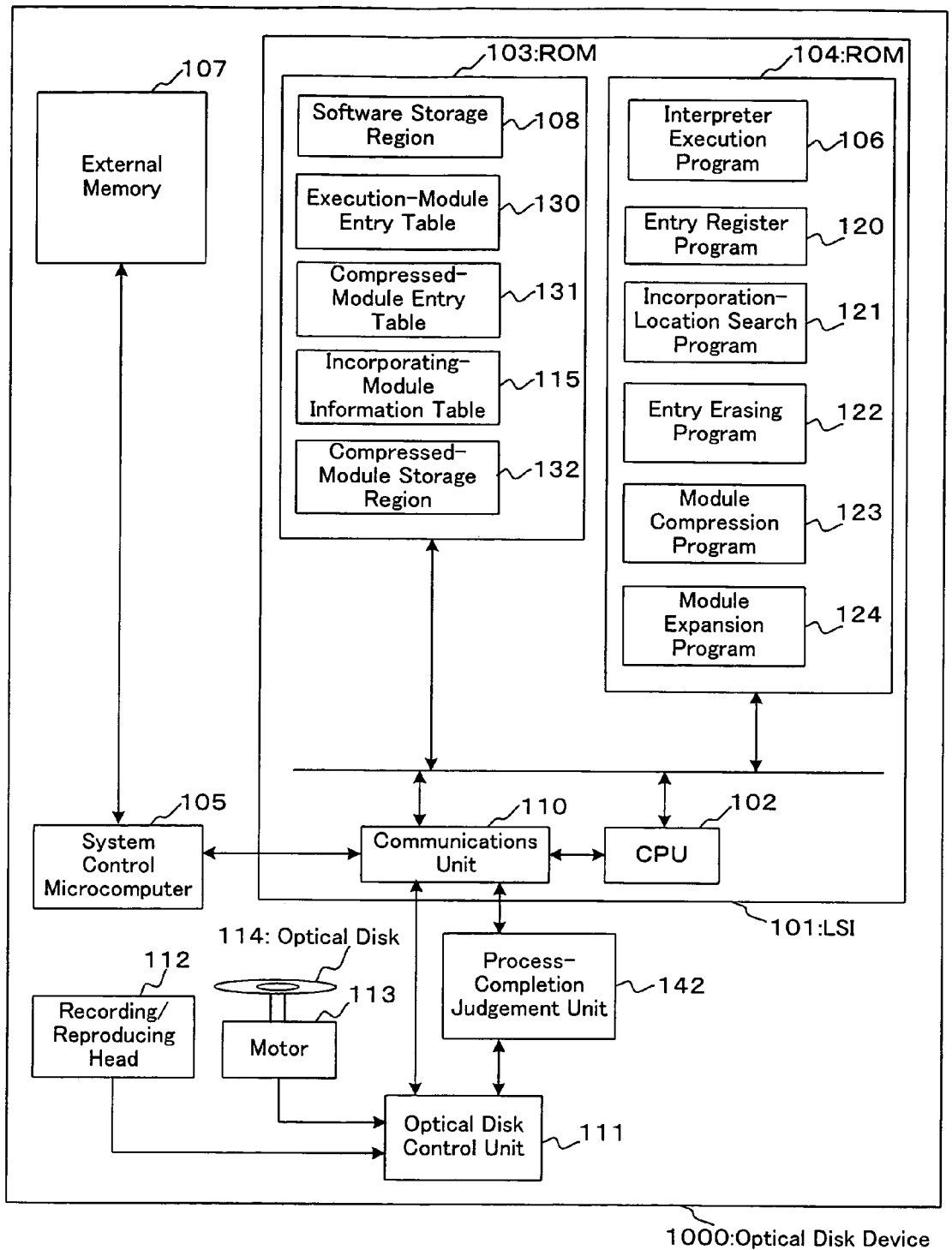
FIG. 19 is a conceptual diagram showing the configuration of a device according to Embodiment 6 of the present invention.

Hereinafter, Embodiment 6 of the present invention is described with reference to the drawings. FIG. 19 shows the configuration of an optical disk device according to the present embodiment. As shown in FIG. 19, in the optical disk device according to the present embodiment, the media discrimination unit 141 is omitted from and a process-completion judgement unit 142 for judging whether the process of controlling an optical disk has been completed is added to the optical disk device 1000 shown in FIG. 17 illustrating the configuration of the device according to Embodiment 5. The system control microcomputer 105 and the CPU 102 can access the optical disk control unit 111 and the process-completion judgement unit 142 through the communications unit 110.

With respect to the operation of the optical disk device according to the present embodiment, descriptions of the same parts as those in the device according to Embodiment 5 are not repeated herein. The software stored in the external memory 107 is composed of a plurality of modules that implement processes of controlling an optical disk (hereinafter, each of the modules is referred to as a "process module"). In this case, one process module implements one process.

Figure 20:
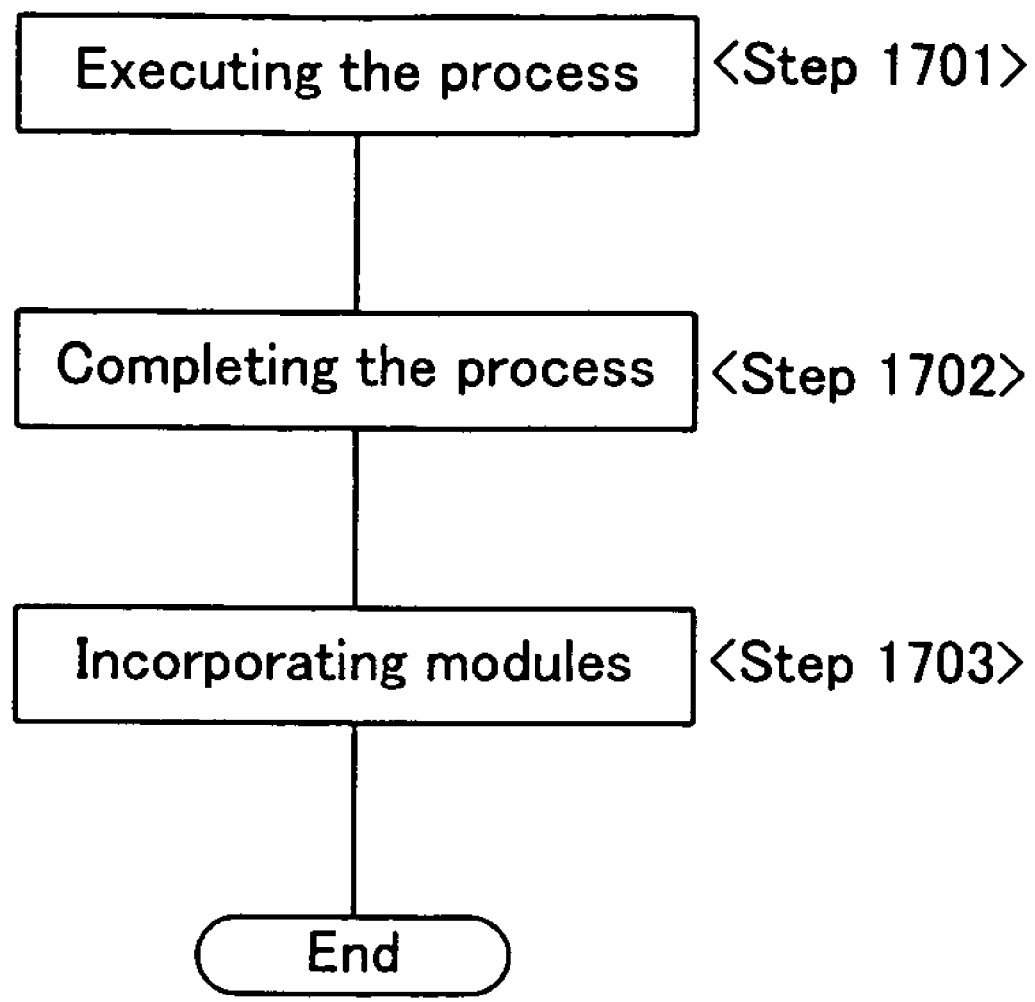
FIG. 20 is a flowchart showing a process of incorporating software into a memory according to Embodiment 6 of the present invention.

FIG. 20 shows a procedure for storing, in the RAM 103, a process module, out of the process modules of the software stored in the external memory 107, specified by the system control microcomputer 105 in the optical disk device 1000 according to the present embodiment. The following description is made with reference to FIG. 20 and is directed to a procedure for incorporating a process module stored in the external memory 107 into the RAM 103 according to the result of the judgement made by the process-completion judgement unit 142. In this case, suppose at least one process module has been stored in the RAM 103.

At Step 1701, when the system control microcomputer 105 issues an interpreter execution command to the CPU 102 through the communications unit 110, the CPU 102 executes the interpreter execution program stored in the ROM 104. The CPU 102 then interprets a process module, out of the process modules stored in the RAM 103, specified by the system control microcomputer 105 to execute it. The CPU 102 operates the optical disk control unit 111 through the communications unit 110 and thereby executes the process. During the process, the process-completion judgement unit 142 continuously monitors the optical disk control unit 111 to check whether the process has been completed.

Subsequently, at Step 1702, when judging that the process has been completed, the process-completion judgement unit 142 notifies the CPU 102 about the completion of the process through the communications unit 110. The CPU 102 then notifies the system control microcomputer 105 about the completion of the process through the communications unit 110.

Next, at Step 1703, the system control microcomputer 105 incorporates the process module, out of the process modules stored in the external memory 107, specified by the system control microcomputer 105, into the RAM 103 through the communications unit 110 by using the procedure for incorporating a module according to Embodiment 1, 2, or 3.

In an optical disk device like the one described above, software that implements the process of controlling an optical disk can be stored in the RAM 103 module by module, with each module corresponding to one of various processes. Accordingly, such an optical disk device allows the capacity of the RAM 103 to be used to be kept down to a minimum when compared to the conventional device that stores all process modules in the RAM. Furthermore, it is not necessary to store, in the RAM 103, the whole software that has been stored in the external memory 107 and is required to control optical disks. Accordingly, it is possible to develop optical disk devices without placing a limitation that the size of the software must not exceed that of the software region of the RAM 103.

Embodiment 7

Figure 21:
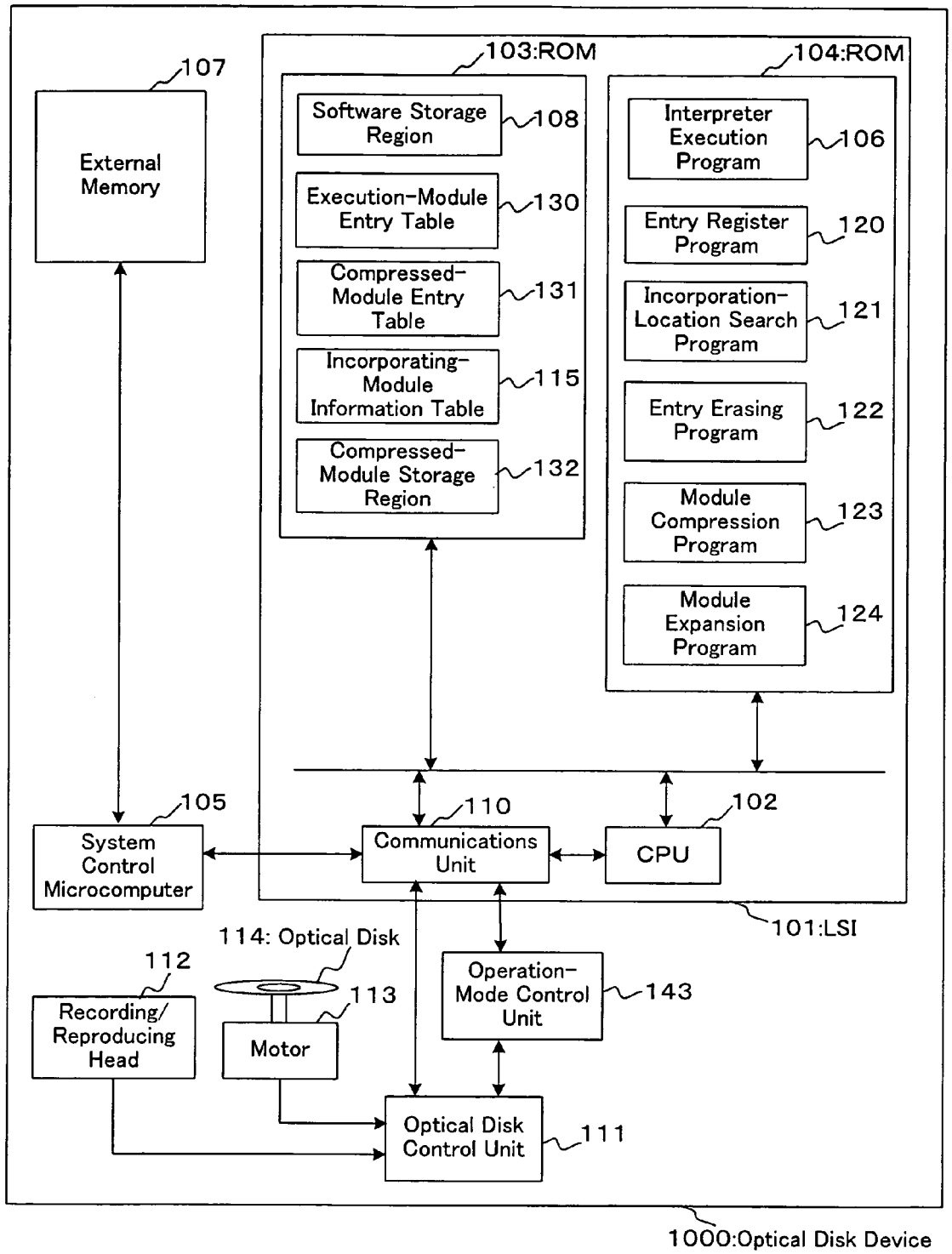
FIG. 21 is a conceptual diagram showing the configuration of a device according to Embodiment 7 of the present invention.

Hereinafter, Embodiment 7 of the present invention is described with reference to the drawings. FIG. 21 shows the configuration of an optical disk device according to the present embodiment. As shown in FIG. 21, in the optical disk device according to the present embodiment, the media discrimination unit 141 is omitted from and an operation-mode control unit 143 is added to the optical disk device 1000 shown in FIG. 17 illustrating the configuration of the device according to Embodiment 5. The operation-mode control unit 143 controls the change of operation modes in the optical disk device according to the present embodiment. The system control microcomputer 105 and the CPU 102 can access the optical disk control unit 111 and the operation-mode control unit 143 through the communications unit 110.

With respect to the operation of the optical disk device according to the present embodiment, descriptions of the same parts as those in Embodiment 5 are not repeated herein. The software stored in the external memory 107 is composed of a plurality of modules that implement controls at various operation modes in the optical disk device (hereinafter, each of the modules is referred to as an "operation-mode module"). In this case, the external memory 107 includes the following four operation-mode modules stored therein: 1) a module for controlling an active state (hereinafter, referred to as an "active module"); 2) a module for controlling a sleep state (hereinafter, referred to as a "sleep module"); 3) a module for controlling a stand-by state (hereinafter, referred to as a "stand-by module"); and 4) a module for controlling an idle state (hereinafter, referred to as an "idle module").

Figure 22:
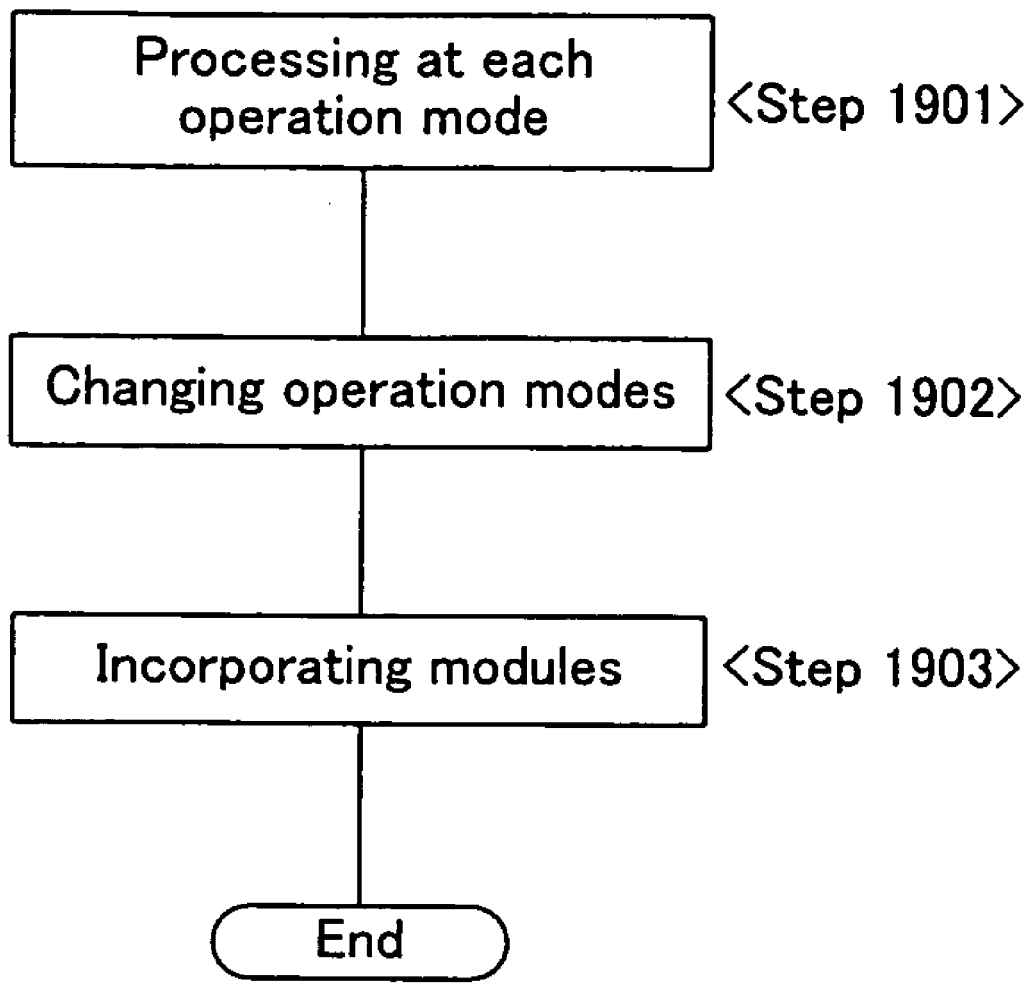
FIG. 22 is a flowchart showing a process of incorporating software into a memory according to Embodiment 7 of the present invention.

FIG. 22 shows a procedure for storing, in the RAM 103, an operation-mode module specified by the system control microcomputer 105, out of the active module, sleep module, stand-by module, and idle module that have been stored in the external memory 107. In this case, suppose at least one module has been stored in the RAM 103.

The following description is made with reference to FIG. 22 and is directed to a method of incorporating a module specified by the system control microcomputer 105 into the RAM 103 according to the change in operation mode controlled by the operation-mode control unit 143.

At Step 1901, when the system control microcomputer 105 issues an interpreter execution command to the CPU 102 through the communications unit 110, the CPU 102 executes the interpreter execution program stored in the ROM 104. The CPU 102 then interprets an operation-mode module specified by the system control microcomputer 105, out of the operation-mode modules stored in the RAM 103, to execute it. While the CPU 102 executes the operation-mode module specified by the system control microcomputer 105, the operation-mode control unit 143 continuously monitors the CPU 102 through the communications unit 110 to check whether the operation mode has been changed.

Subsequently, at Step 1902, when judging that the operation mode has been changed, the operation-mode control unit 143 notifies the system control microcomputer 105 about the completion of the process through the communications unit 110.

Next, at Step 1903, the system control microcomputer 105 incorporates, into the RAM 103, the operation-mode module specified by the system control microcomputer 105, out of the operation-mode modules stored in the external memory 107. This incorporation is carried out through the communications unit 110 by using the procedure for incorporating a module according to Embodiment 1, 2, or 3.

In an optical disk device like the one described above, software that implements the control of operation modes can be stored in the RAM 103 module by module according to the operation mode concerned. Accordingly, such an optical disk device allows the capacity of the RAM 103 to be used to be kept down when compared to the conventional device that stores all operation-mode modules in the RAM. Furthermore, it is not necessary to store, in the RAM 103, the whole software that has been stored in the external memory 107 and is required to control the optical disk. Consequently, it is possible to develop optical disk devices without placing a limitation that the size of the software must not exceed that of the software region of the RAM 103. Moreover, it is necessary to refresh modules stored in the RAM 103 during the sleep mode, but when the modules are incorporated individually into the RAM 103 depending on the operation state as in the present embodiment, the refreshment of the memory to be carried out during the sleep mode may be conducted with respect to the sleep module alone, which results in low power consumption.

Embodiment 8

Hereinafter, Embodiment 8 of the present invention is described with reference to the drawings. The configurations of a LSI and device according to the present embodiment are shown in FIG. 6 as in Embodiment 2. However, the present embodiment is slightly different from Embodiment 2 in a specific operation of programs contained in the ROM 104. In the present embodiment, the description is directed to a procedure for erasing unnecessary modules from the LSI using an LSI-containing CPU alone.

Figure 23:
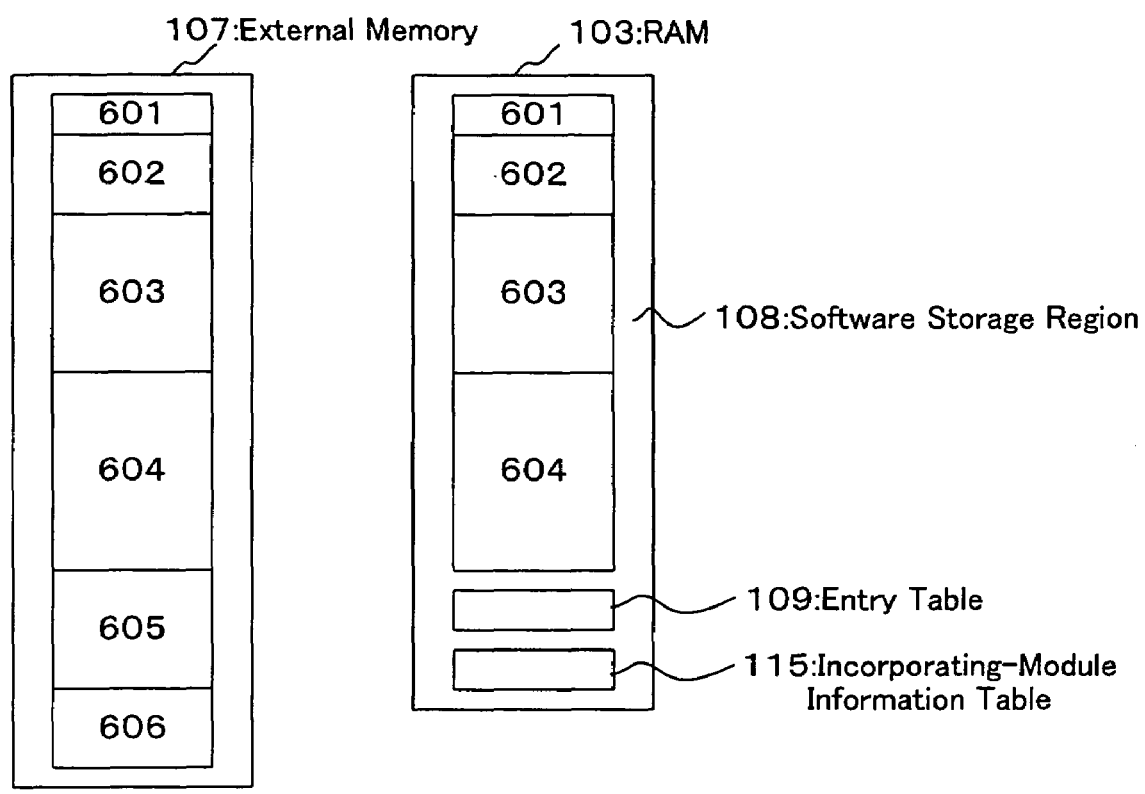
FIG. 23 is a conceptual diagram showing a configuration of modules in a device according to Embodiment 8 of the present invention.
Figure 24:
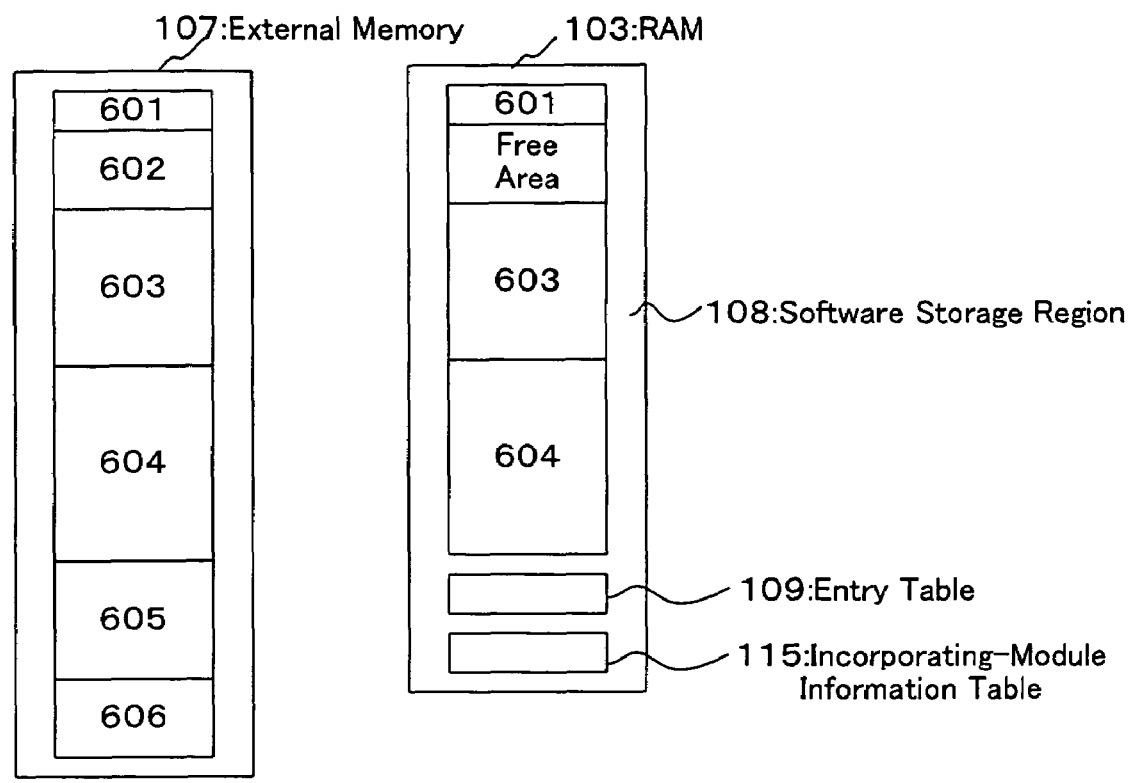
FIG. 24 is a conceptual diagram showing a configuration of modules in the device according to Embodiment 8 of the present invention.
Figure 25:
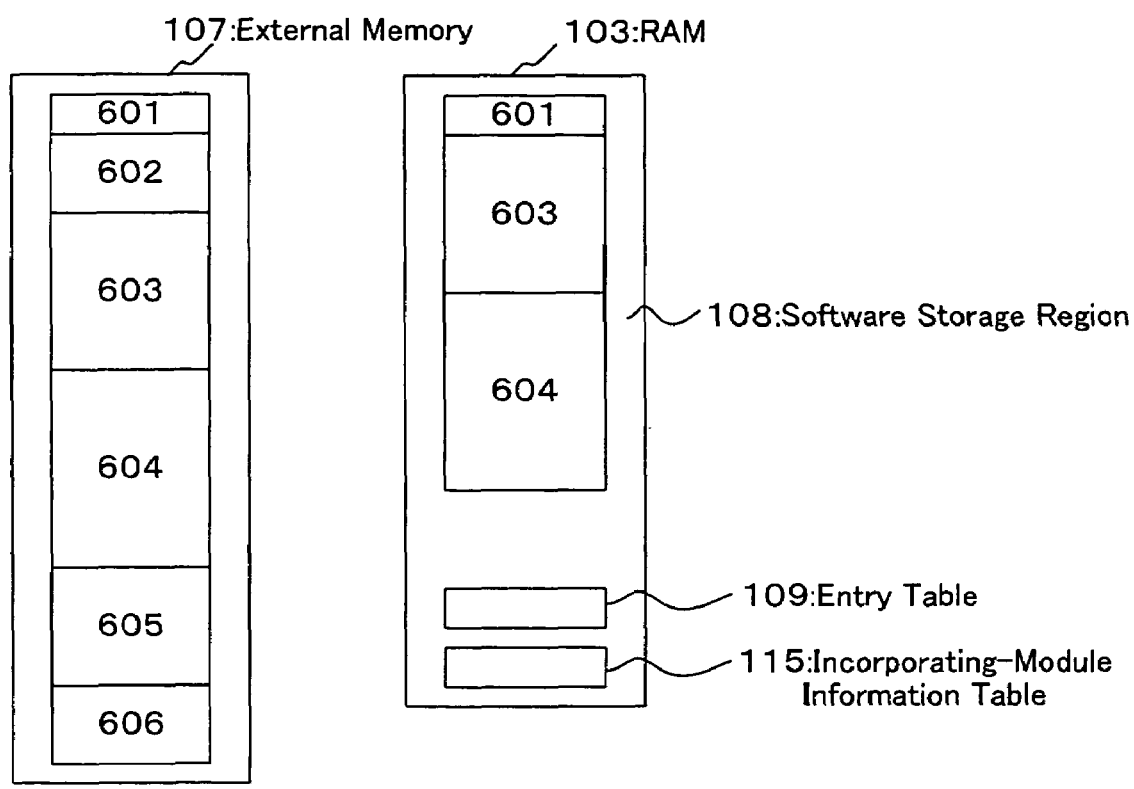
FIG. 25 is a conceptual diagram showing a configuration of modules in the device according to Embodiment 8 of the present invention.
Figure 26:
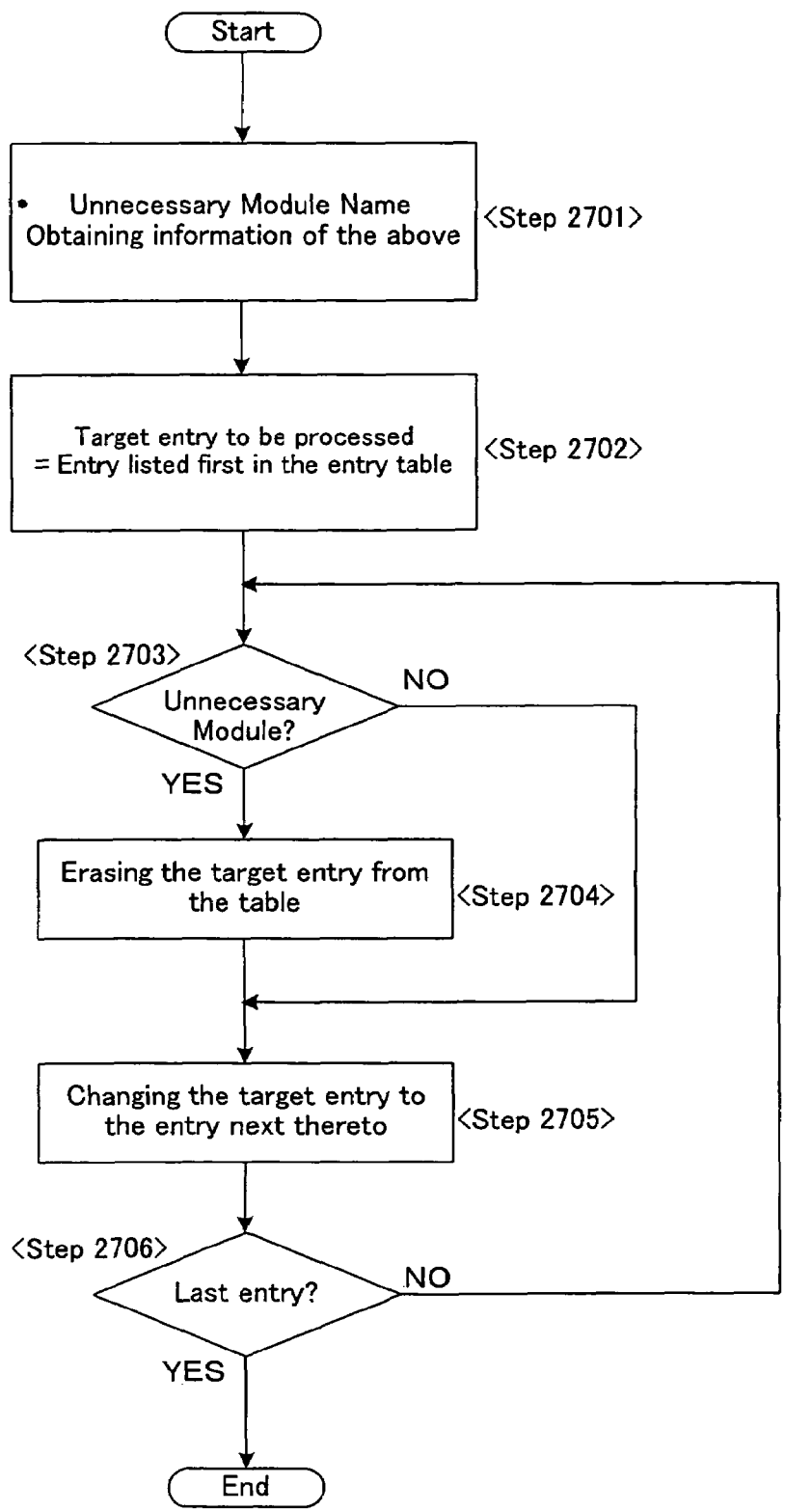
FIG. 26 is a flowchart showing a process of erasing unnecessary software from a memory in Embodiment 8 of the present invention.
Figure 27:
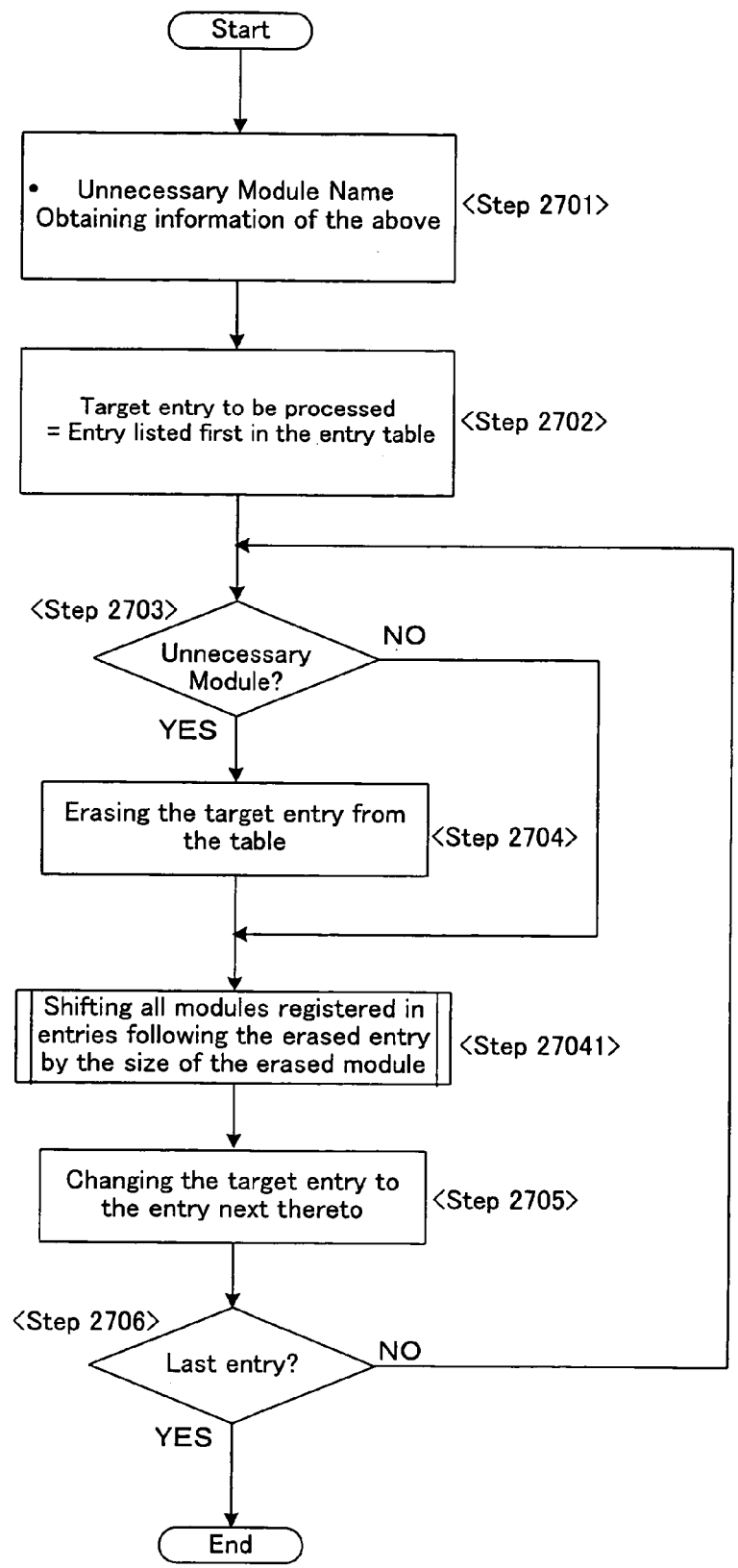
FIG. 27 is a flowchart showing a process of erasing unnecessary software from the memory in Embodiment 8 of the present invention.
Figure 28:
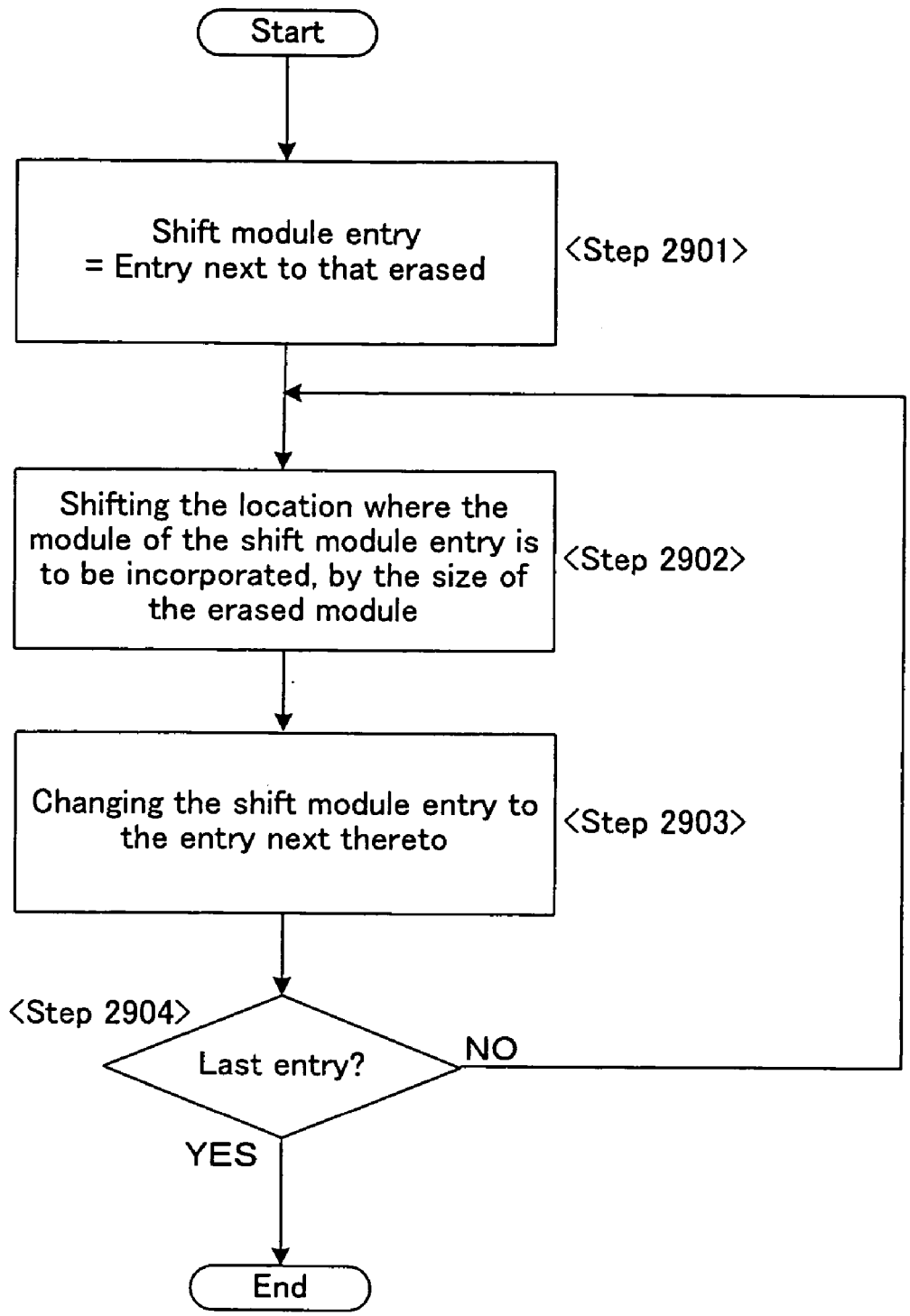
FIG. 28 is a flowchart showing a process of erasing unnecessary software from the memory in Embodiment 8 of the present invention.
Figure 30:
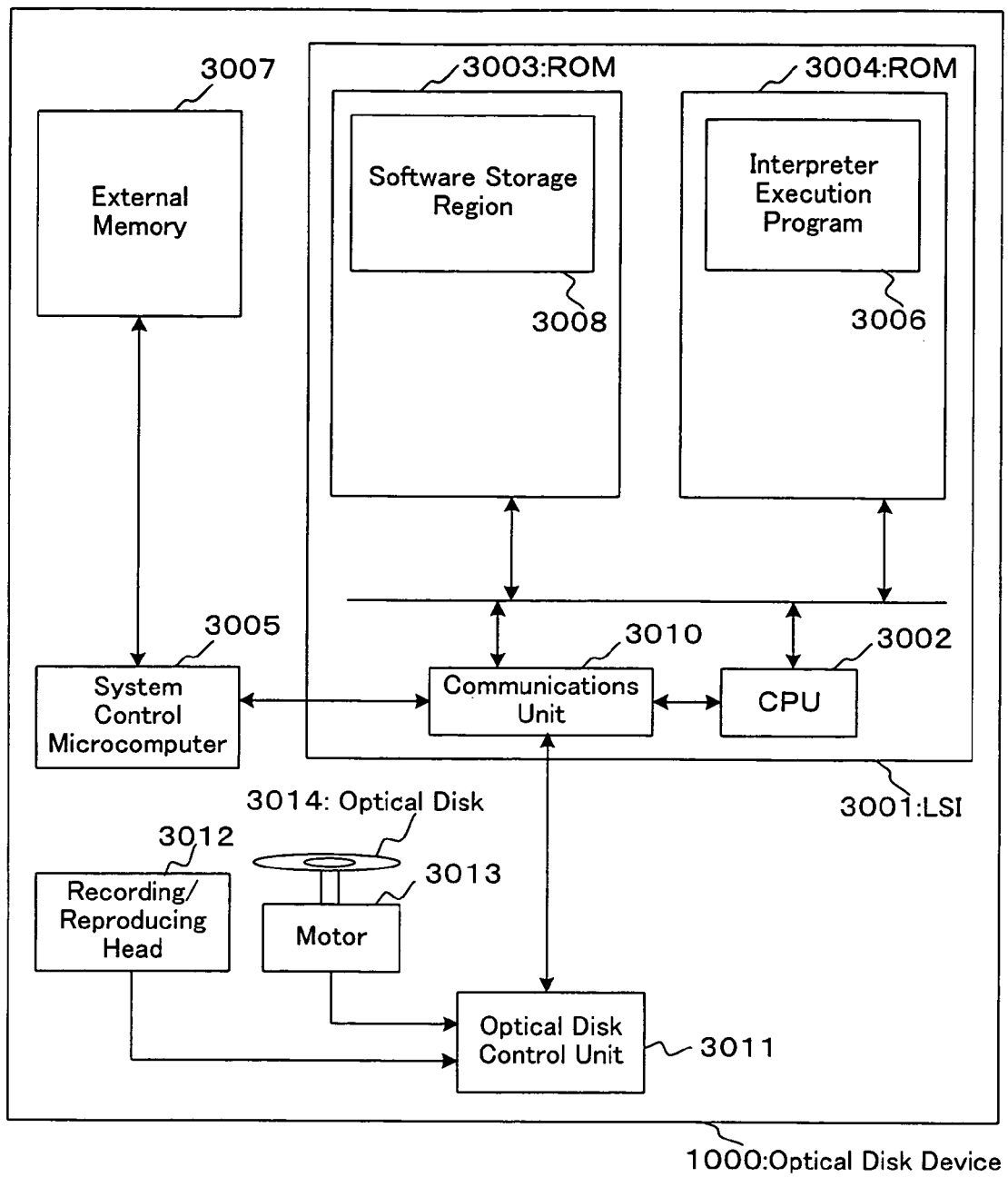
FIG. 30 is a conceptual diagram showing the configuration of a conventional optical disk device.

With respect to the operations of the LSI and device according to the present embodiment, descriptions of the same parts as those in Embodiment 2 are not repeated herein. FIGS. 23, 24, and 25 each show the configuration of modules of software stored in the external memory 107 and the module storage status of the RAM 103. Numeral 601 to 606 indicate modules. The descriptions of the parts indicated in FIGS. 23, 24 and 25 with the same reference numbers as those used in FIG. 6 are not repeated herein. FIGS. 26, 27, and 28 show procedures for erasing, from the RAM 103, an arbitrary module of software stored in the external memory 107. FIGS. 29A to 29C show transitions in the entry table 109 that are resulted from the erasure of the arbitrary module of the software stored in the external memory 107 from the RAM 103. Specifically, FIGS. 23, 24, 25, 29A, 29B, and 29C show the transitions that occur when modules 601, 602, 603, and 604 have been incorporated in the RAM 103 and the module 602 is erased therefrom. The configuration of entries shown in FIGS. 29A to 29C is the same as that shown in FIGS. 10A to 10E in Embodiment 2 and its description therefore is not repeated herein.

The following description is made with reference to FIGS. 23 to 29C and is directed to a specific example of the procedure for erasing, from the RAM 103, the software module 602 that has been incorporated in the RAM 103 but is no longer necessary. In this case, suppose the initial module storage status of the RAM 103 is that shown in FIG. 23 and the content of the entry table 109 is that shown in FIG. 29A. When the system control microcomputer 105 issues, to the LSI 101, an unnecessary-module erasing command (the target to be erased is the module 602), the CPU 102 carries out the process according to the flow shown in FIG. 26. The flow is described below.

First, at Step 2701, the name of the unnecessary module is obtained. In this case, information, "module 602", is obtained.

At Step 2702, the entry listed first in the entry table is taken as the target entry to be processed. In this case, since the initial status of the entry table 109 is that shown in FIG. 29A, the entry of Registration No. 1 (the module 601) is the target entry to be processed.

Next, at Step 2703, it is judged whether the target entry to be processed is an unnecessary one. In this case, the module 601 of Registration No. 1 is not an unnecessary one, and the process proceeds following the arrow accompanied by "NO".

At Step 2705, the target entry is changed to the next entry. In this case, the target entry is changed to the entry next to Registration No. 1, i.e. the entry of Registration No. 2 (the module 602).

At Step 2706, it is judged whether the last entry listed in the entry table has been processed. In this case, only the entry of Registration No. 1 has been processed. Accordingly, the process proceeds following the arrow accompanied by "NO".

At Step 2703, it is judged whether the target entry to be processed is an unnecessary one. In this case, the module 602 of Registration No. 2 is an unnecessary one, and the process proceeds following the arrow accompanied by "YES".

Subsequently, at Step 2704, the target entry is erased from the entry table 109. In this case, the entry of Registration No. 2 is erased. With this erasure, the content of the entry table 109 is changed to that shown in FIG. 29B. In the description of the present embodiment, when an entry is erased, immediately thereafter, the entries following the entry thus erased are brought forward. However, when the erasure of the entry concerned can be identified by means of, for example, flag information provided for the respective entries, there is no problem even if the entries following the entry erased are not brought forward immediately after the erasure.

At Step 2705, the target entry is changed to the next entry. In this case, the next entry is that next to the entry of Registration No. 2. However, the entry of Registration No. 2 in the initial status has been erased and the status of the entry table 109 has been changed to that shown in FIG. 29B. The next entry therefore is that of Registration No. 2 (the module 603).

At Step 2706, it is judged whether the last entry listed in the entry table has been processed. In this case, only the entries of Registration No. 1 and Registration No. 2 (listed in the status shown in FIG. 29A) have been processed. Accordingly, the process proceeds following the arrow accompanied by "NO".

At Step 2703, it is judged whether the target entry to be processed is an unnecessary one. In this case, the module 603 of Registration No. 2 (listed in the status shown in FIG. 29B) is not an unnecessary one. Accordingly, the process proceeds following the arrow accompanied by "NO".

Subsequently, at Step 2705, the target entry is changed to the next entry. In this case, the target entry is changed to the entry next to Registration No. 2, i.e. the entry of Registration No. 3 (the module 604).

At Step 2706, it is judged whether the last entry listed in the entry table has been processed. In this case, only the entries of Registration Nos. 1 and 2 (listed in the status shown in FIG. 29B) have been processed. Accordingly, the process proceeds following the arrow accompanied by "NO".

At Step 2703, it is judged whether the target entry to be processed is an unnecessary one. In this case, the module 604 of Registration No. 3 (listed in the status shown in FIG. 29B) is not an unnecessary one. Accordingly, the process proceeds following the arrow accompanied by "NO".

Subsequently, at Step 2705, the target entry is changed to the next entry. In this case, there is no entry next to that of Registration No. 3 and therefore the target entry is renewed as absence. Specifically, the absence can be indicated with Registration No. that does not exist. However, for example, the target entry may be changed to the next entry of Registration No. 4 (an entry that does not exist), or a registration no. that indicates the absence may be predetermined and the target entry may be changed to that of the registration no. thus predetermined.

At Step 2706, it is judged whether the last entry listed in the entry table has been processed. In this case, the last entry, i.e. Registration No. 3 (listed in the status shown in FIG. 29B) was processed. Accordingly, the process proceeds following the arrow accompanied by "YES" and thereby the processing flow shown in FIG. 26 ends.

With the process described above, unnecessary modules can be erased from the RAM 103 as required. In addition, required modules can be incorporated (later on) as described in other embodiments mentioned above. Thus, even during the operation of the LSI, the selection of a module required at that moment can be made and thereby the memory capacity of the RAM to be used 103 can be reduced as compared to the total capacity of programs to be executed in the LSI.

Moreover, in order to prevent memory efficiency from deteriorating due to discontinuous free areas generated in the RAM 103 when an unnecessary module is erased, modules that have been incorporated may be relocated in the memory. In the below, a specific example of the processing procedure employed in relocating modules is described with reference to FIG. 27.

FIG. 27 shows the procedure for erasing, from the RAM 103, an arbitrary module of software stored in the external memory 107 as in FIG. 26 but includes Step 27041 in addition to those included in FIG. 26. The other steps are the same as those shown in FIG. 26 and therefore detailed descriptions thereof are not repeated herein. Step 27041 is executed subsequent to Step 2704 at which the target entry is erased from the entry table. At Step 27041, all the modules that have been registered in the entries following the entry erased at Step 2704 are shifted by the size of the module erased. With this process, the memory region of the RAM 103 whose module storage region has become discontinuous as shown in FIG. 24 after the erasure of the module 602 regains the continuity in the module storage region as shown in FIG. 25. Consequently, when, for example, a new module is to be added thereafter, the RAM 103 can be used efficiently.

FIG. 28 shows an example of the process flow through which the process to be executed at Step 27041 shown in FIG. 27 is implemented. At Step 2901, the entry of the module next to the module that has been erased is taken as a shift module entry. When being described using the aforementioned example, the shift module entry is the entry of Registration No. 2 shown in FIG. 29B.

At Step 2902, the location where the module of the shift module entry is to be incorporated is shifted by the size of the module that has been erased. In this case, the size of the module 602 that has been erased is 200 kilobytes. Accordingly, 300 (kilobytes) indicated in the column of the initial address of the entry of Registration No. 2 is reduced by 200 (kilobytes) and thereby the initial address is changed to 100 (kilobytes). In this connection, usually the shift is made to result in a smaller memory address as in the present example, but the shift may be made to result in a larger memory address in the case of a memory map in which modules are stored in decreasing order of memory address.

At Step 2903, the shift module entry is changed to the next entry (that is one next to the module shifted in the above), i.e. Registration No. 3.

At Step 2904, it is judged whether the last entry has been processed as the shift module entry. If YES, i.e. when the process of the last entry has been completed, the process flow shown in FIG. 28 ends. On the other hand, if NO, i.e.

when the process of the last entry has not been completed yet, the process returns to Step 2902. In this case, Registration No. 3 has not been processed yet, the process returns to Step 2902.

As described above, thereafter, the procedures of Steps 2902 to 2904 are repeated until the last entry is processed as the shift module entry. With the process flow described above, the process carried out at Step 27041 shown in FIG. 27 can be executed. With this process flow, the status of the entry table 109 changes from that shown in FIG. 29B to FIG. 29C. In FIG. 29C there is not found the fragmented free area located between 100 and 300 that was present in the status shown in FIG. 29B. Consequently, when new modules are to be added thereafter, the RAM 103 can be used efficiently.

As described above, the present invention provides a CPU-containing LSI in which the capacity of the RAM to be used is kept down by partially incorporating, into the RAM, software stored in the external memory. In addition, through its use, the present invention allows optical disk devices to be developed and provided without being limited by the memory capacity of the RAM.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A CPU-containing LSI, comprising:
    a CPU;
    a RAM; and
    a read-in control unit for controlling read-in of software from an external memory to the RAM on a module-by-module basis,
    wherein the RAM comprises:
    a software storage region where the software read in from the external memory on the module-by-module basis is stored; and
    an entry storage region where an entry is stored, the entry including at least information as to a location and a size of a module stored in the software storage region, and
    the read-in control unit refers to the entry stored in the entry storage region of the RAM to decide a location where a module to be read in from the external memory to the software storage region of the RAM is to be stored.

2. The CPU-containing LSI according to claim 1, wherein the read-in control unit erases, from the entry-storage region of the RAM, an entry corresponding to an unnecessary module stored in the software storage region of the RAM.

3. The CPU-containing LSI according to claim 1, further comprising a ROM that stores at least a read-in control program for controlling read-in of software from the external memory to the RAM,
    wherein the read-in control unit is implemented through execution of the read-in control program carried out by the CPU.

4. The CPU-containing LSI according to claim 1, wherein the CPU and the RAM are contained in one LSI, and the read-in control unit is implemented with a second LSI, the second LSI being located outside the LSI containing the CPU and RAM and being connected thereto.

5. A CPU-containing LSI, comprising:
    a CPU;
    a RAM;
    a read-in control unit for controlling read-in of software from an external memory to the RAM; and
    a compression/expansion control unit for controlling compression and expansion of the software,
    wherein the RAM comprises:
    an execution-program storage region where the software is stored in a form that permits the CPU to refer thereto; and
    a compressed-program storage region where at least part of the software is stored in a compressed form,
    when the read-in control unit reads in at least part of the software from the external memory to the RAM, the compression/expansion control unit compresses at least part of the software that has been read in to the execution-program storage region and then stores it in the compressed-program storage region, and
    when the software stored in the compressed-program storage region is required to be executed, the compression/expansion control unit expands the software and then stores it in the execution-program storage region.

6. The CPU-containing LSI according to claim 5, further comprising a ROM that stores at least a read-in control program for controlling read-in of software from the external memory to the RAM,
    wherein the read-in control unit is implemented through execution of the read-in control program carried out by the CPU.

7. The CPU-containing LSI according to claim 5, wherein the CPU and the RAM are contained in one LSI, and the read-in control unit is implemented with a second LSI, the second LSI being located outside the LSI containing the CPU and the RAM and being connected thereto.

8. An LSI device, comprising:
    a CPU-containing LSI including a CPU and a RAM; and
    a read-in control LSI that serves as a read-in control unit for controlling read-in of software from an external memory to the RAM on a module-by-module basis, the external memory being located outside the CPU-containing LSI,
    wherein the RAM comprises:
    a software storage region where the software read in from the external memory on the module-by-module basis is stored; and
    an entry storage region where an entry is stored, the entry including at least information as to a location and a size of a module stored in the software storage region, and
    the read-in control unit refers to the entry stored in the entry storage region of the RAM to decide a location where a module to be read in from the external memory to the software storage region of the RAM is to be stored.

9. An LSI device, comprising:
    a CPU-containing LSI including a CPU and a RAM; and
    a control LSI that serves as a read-in control unit for controlling read-in of software to the RAM from an external memory located outside the CPU-containing LSI and a compression/expansion control unit for controlling compression and expansion of the software,
    wherein the RAM comprises:
    an execution-program storage region where the software is stored in a form that permits the CPU to refer thereto; and
    a compressed-program storage region where at least part of the software is stored in a compressed form, when the read-in control unit reads in at least part of the software from the external memory to the RAM, the compression/expansion control unit compresses the at least part of the software that has been read in to the execution-program storage region, and then stores it in the compressed program storage region, and when the software stored in the compressed-program storage region is required to be executed, the compression/expansion control unit expands the software and then stores it in the execution-program storage region.

* * * * *